Jan. 10, 1961 — L. W. WELLS — 2,967,453
MOTION PICTURE PROJECTION SYSTEM UTILIZING BEAM SPLITTING MEANS
Filed March 31, 1959 — 9 Sheets-Sheet 4
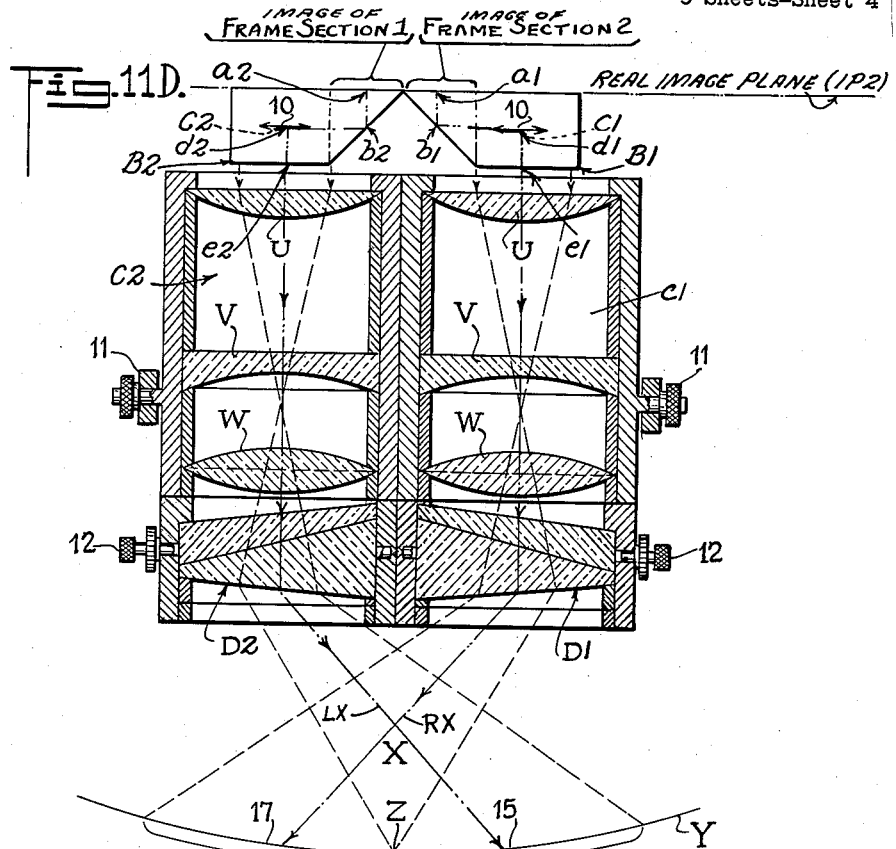
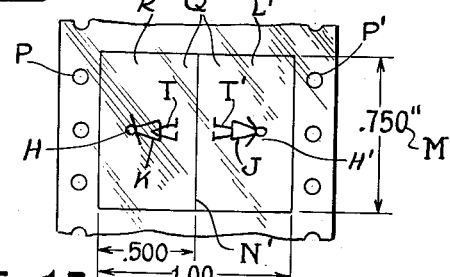
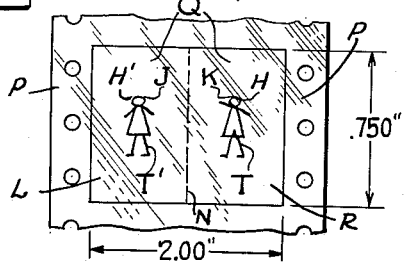
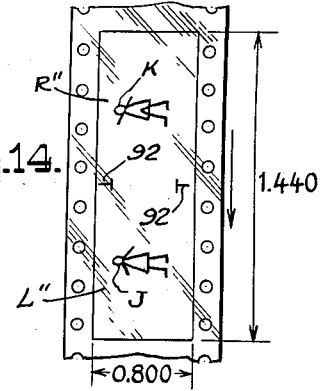
INVENTOR
L. W. WELLS.
BY
ATTORNEY

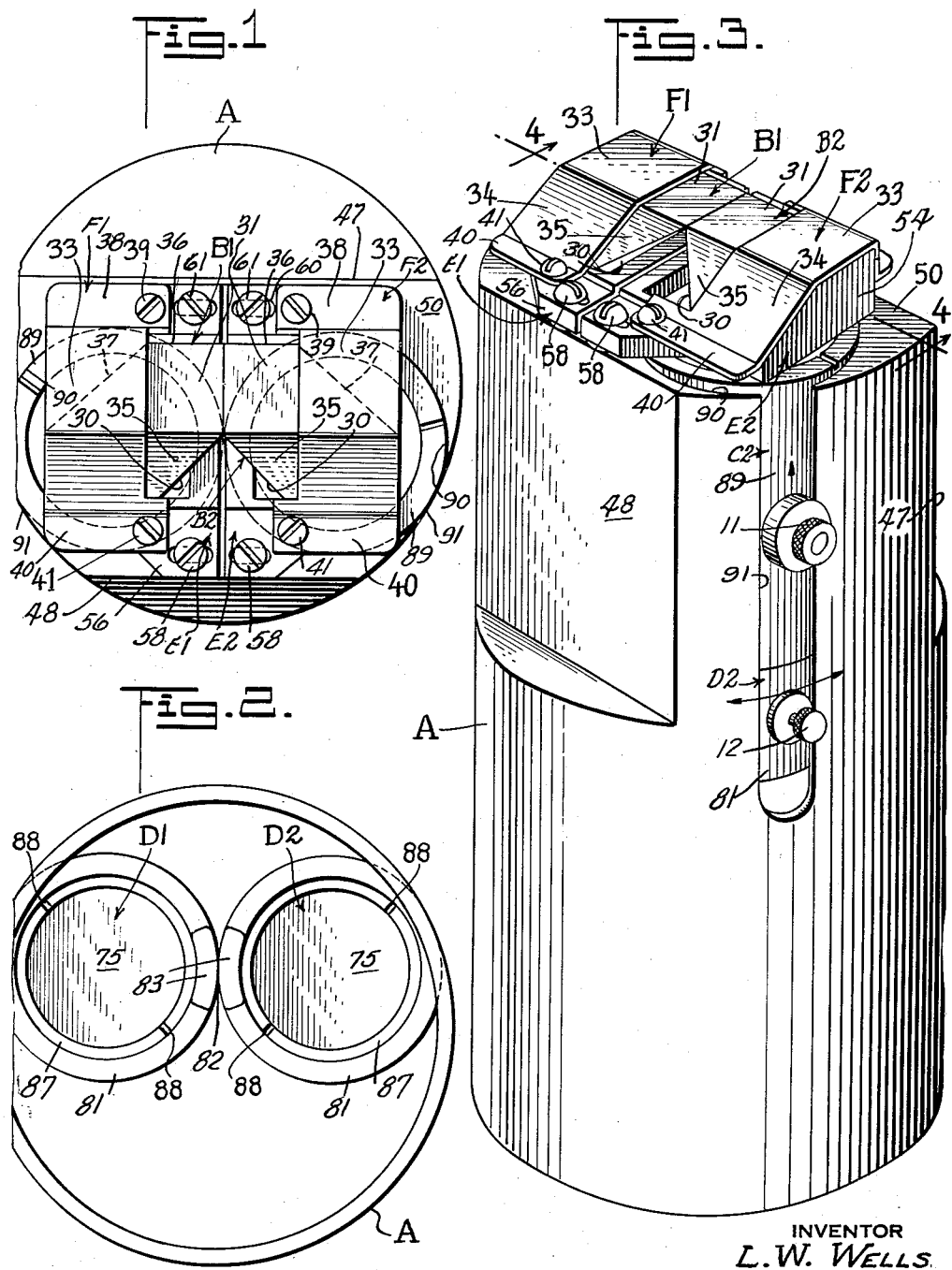

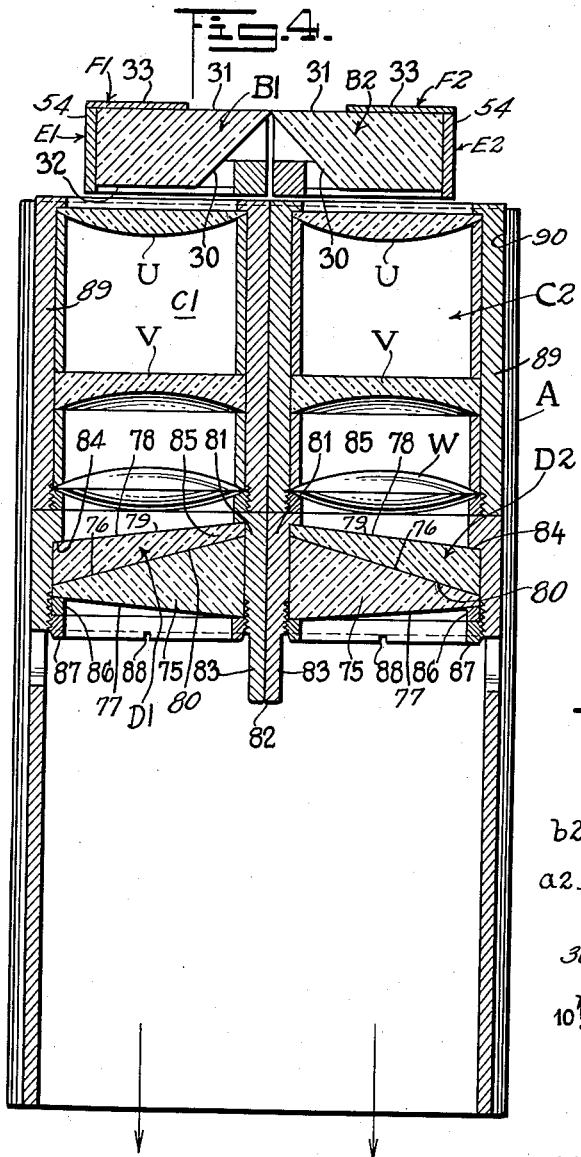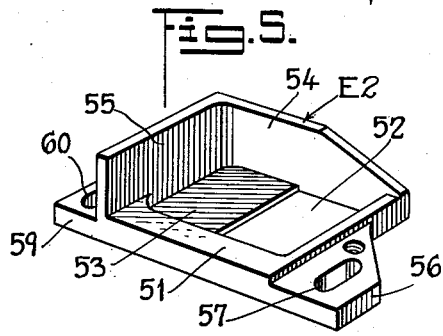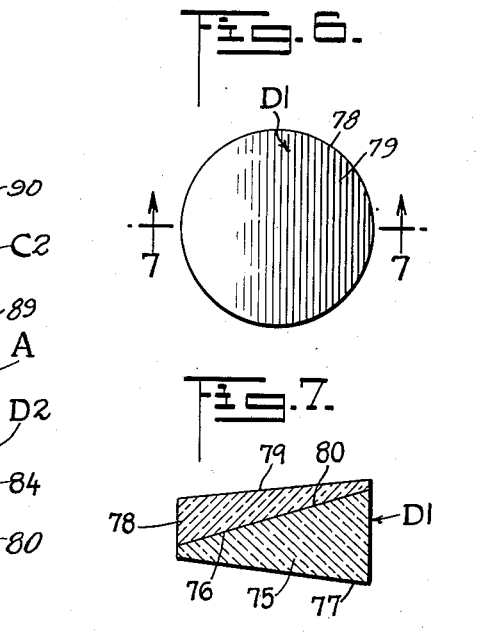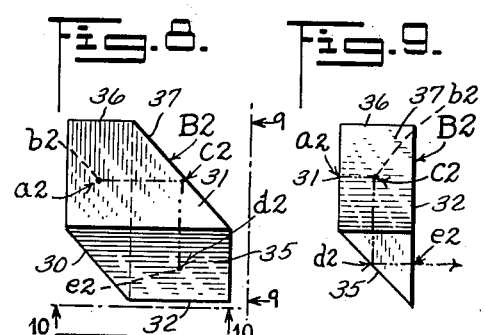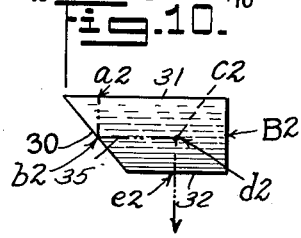

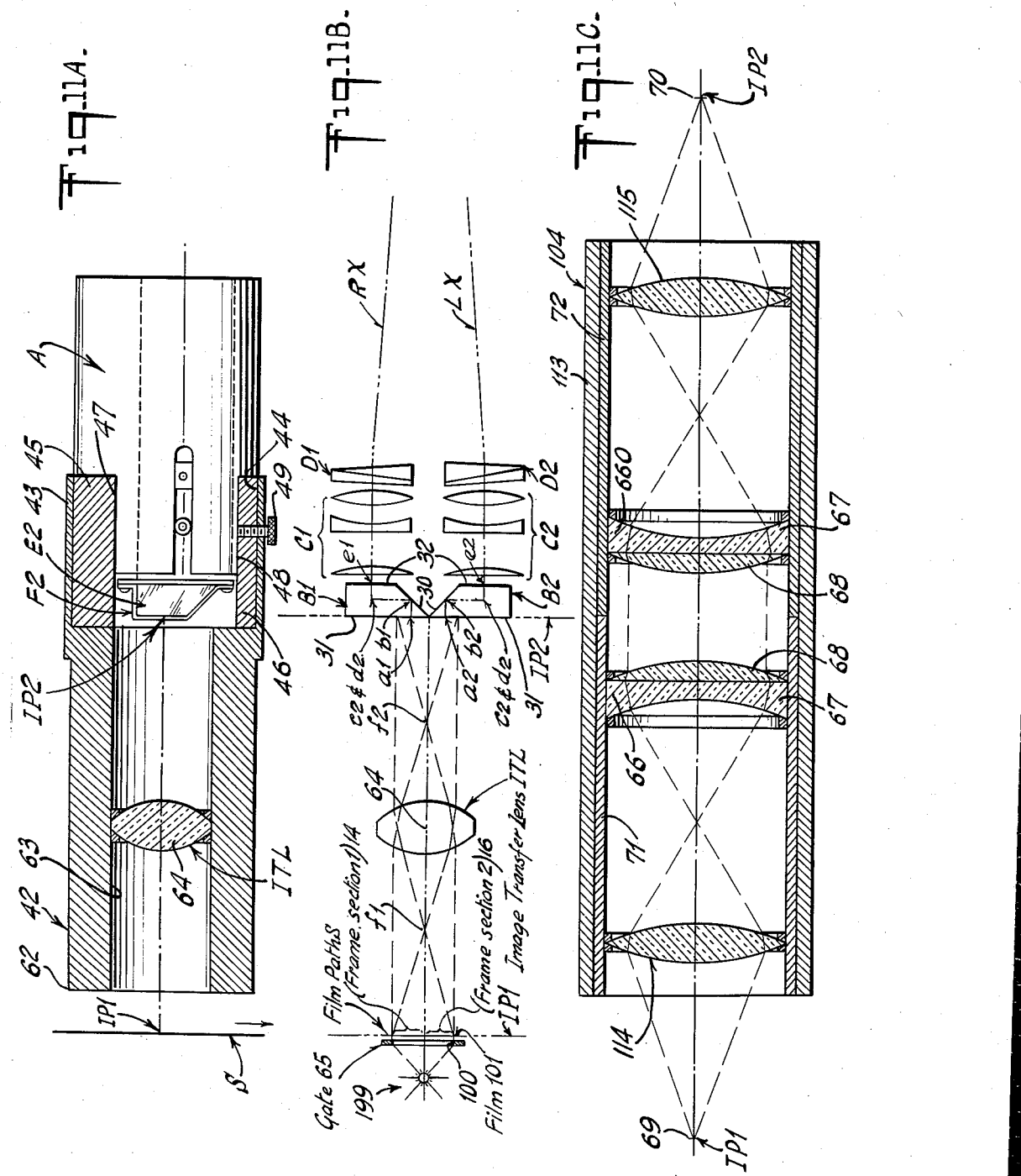

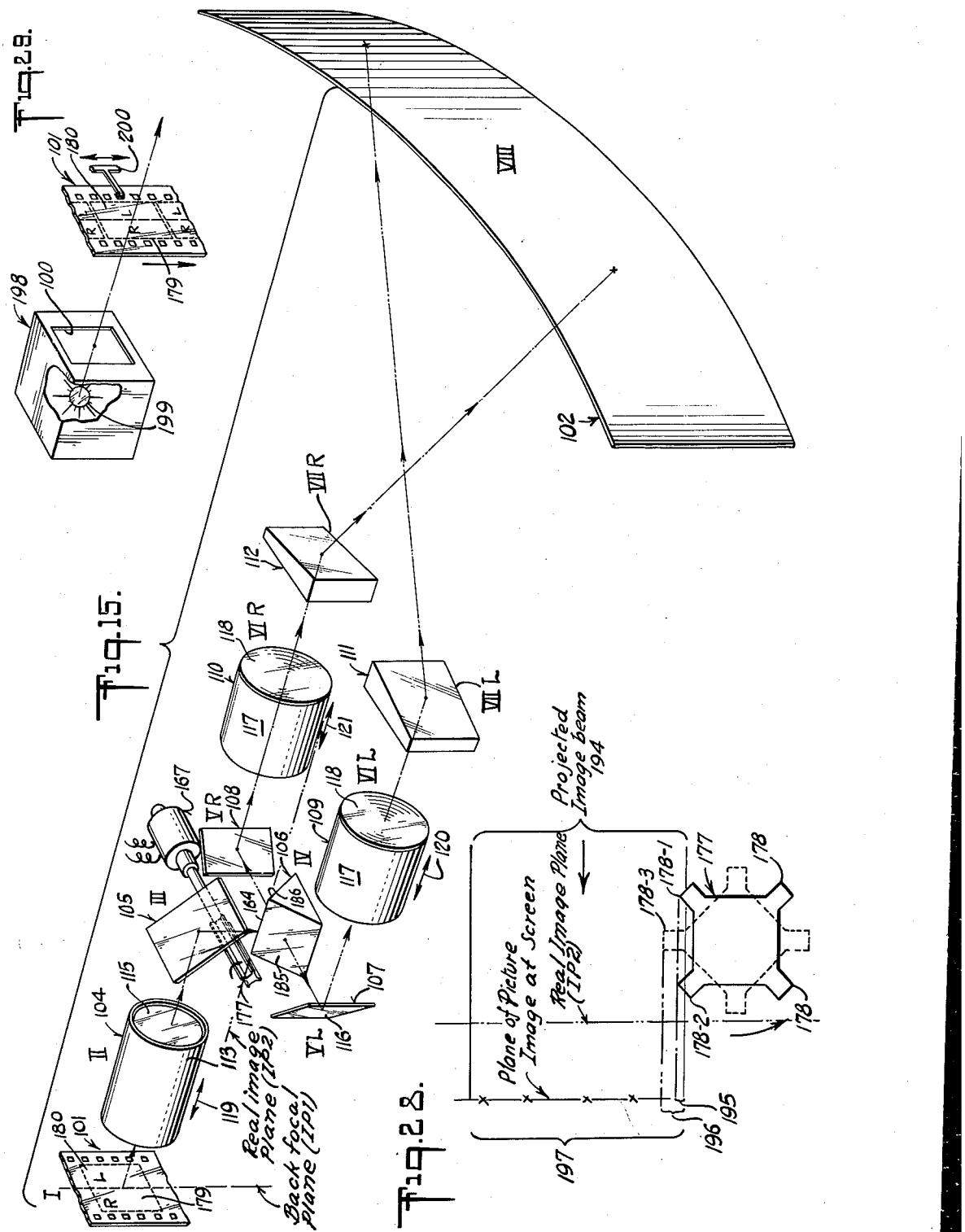

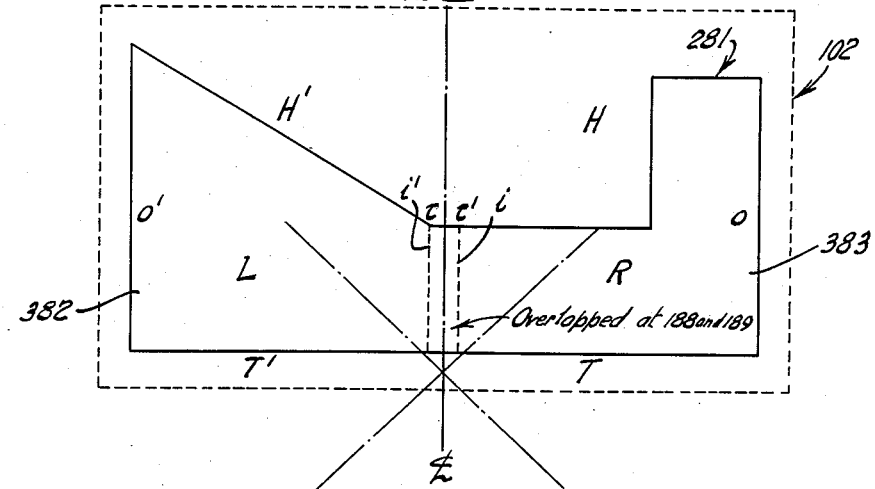

Jan. 10, 1961 L. W. WELLS 2,967,453
MOTION PICTURE PROJECTION SYSTEM UTILIZING BEAM SPLITTING MEANS
Filed March 31, 1959 9 Sheets-Sheet 7

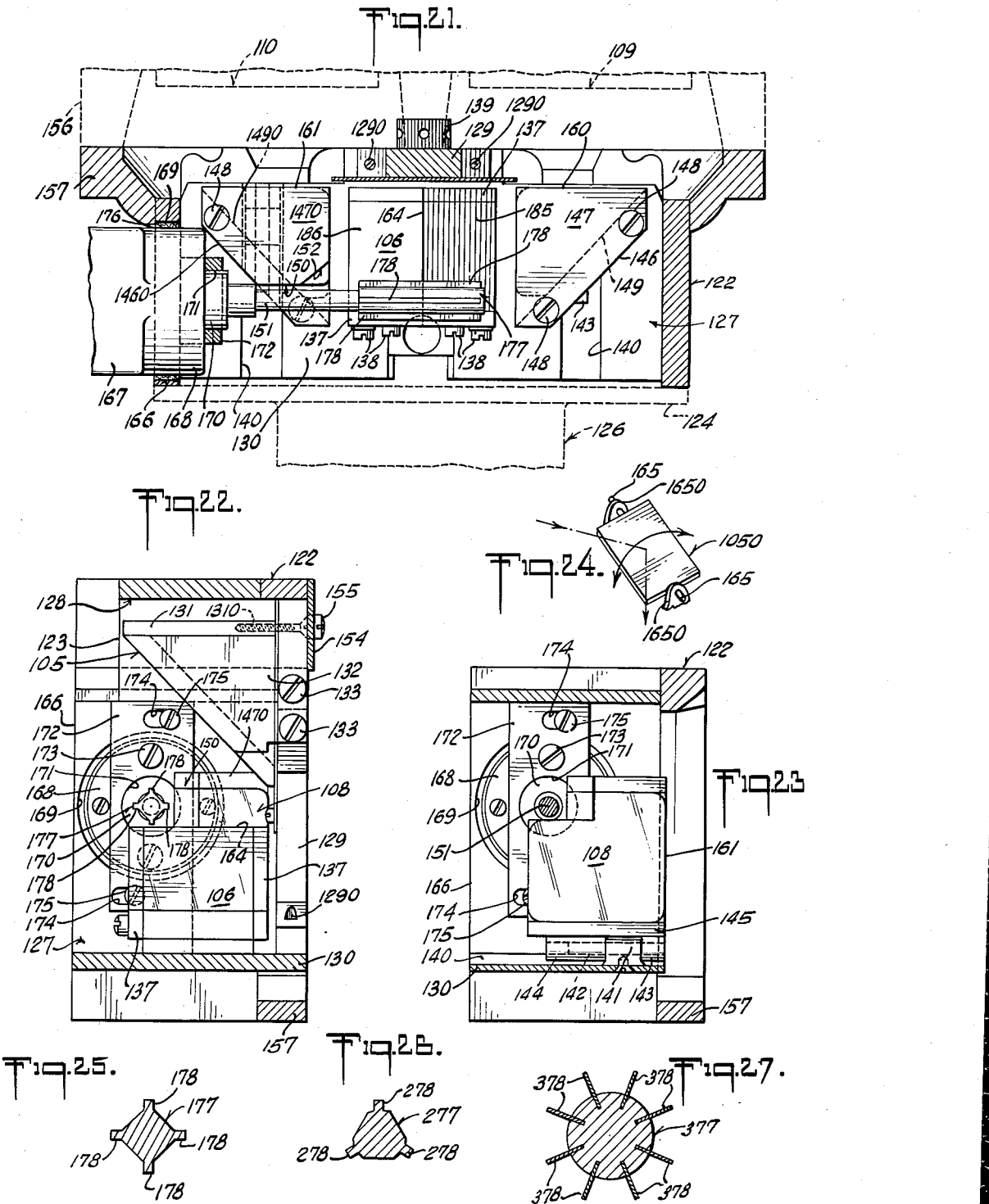

2,967,453
MOTION PICTURE PROJECTION SYSTEM UTILIZING BEAM SPLITTING MEANS

Leon W. Wells, Fort Lee, N.J., assignor to Leon Bronesky, New York, N.Y.

Filed Mar. 31, 1959, Ser. No. 803,323

18 Claims. (Cl. 88—16.6)

The present invention relates to picture image splitting means, a motion picture projection system utilizing the same, and methods of splitting picture images and using such equipment. The system in one form involves the use in a projector of an optical unit assembly for the projection of thirty-five millimeter or other size special films bearing separated image portions, and the present application is a continuation-in-part of my prior applications Serial No. 673,219, filed July 22, 1957, for Picture Projection System (now abandoned), and Serial No. 727,518, filed April 4, 1958 (now abandoned) for Motion Picture Projection System, Optical Unit Assembly Thereof, and Method of Use.

With the so-called "Cinerama System" the projection is done not with one projector and one lens but actually with three separate projectors which project three separate image sections to make up the composite picture image on the screen. Each of the three projectors projects into a slightly curved sector of the screen with the three successive sectors together constituting a relatively deeply curved screen having much greater depth than that of the separate sectors, "depth" being the distance normal to a chord extending across from the edges of the portions of the curved screen face and the center of the curved screen face portion. In the system of the present invention since two adjacent sectors of the relatively deeply curved screen are used there is also projection into only slightly curved sectors of appreciably less depth as contrasted with the whole screen and thus with achievement of better peripheral projection to the curved screen as a whole characteristic of such sector projection.

In multiple projection systems, such as those involved in the "Cinerama System," there is a tendency toward relative displacement between the separate image sections which causes a jumping effect in parts of the composite picture image and imbalance of light therein, and it is an object of the present invention to be able to project from a single projector a plurality of separate image sections upon the same screen without such displacement and without difficulty in light balancing in the composite picture image.

Also in such prior multiple systems, it is difficult to balance the three projection systems with respect to each other and it is impractical to use the same in an average theater as the extra projector equipment and additional operators, extra film and the like editing of all of it, as well as the many difficult adjustments which must be made, unduly increases the operating expense. Projecting from different projectors separate parts of the image makes relative displacement very noticeable to the viewer. The carbon arc light sources used therein fluctuate in output density and it is not possible to keep these fluctuations of the different projectors the same so that different light densities are seen in the different sections of the composite picture image.

Thirty-five millimeter (35 mm.) film is conventionally employed in moving picture theaters and wide curved screens are used to give impressive magnitude to the viewed image on the screen and an illusion of depth or three-dimensional effect. When a single composite film image is projected through a single lens unit into such a wide curved screen, image distortion results and desired sharpness is lost since sharpness decreases with increase of the distance on the face of the screen away from its center. Also, in order to attain a picture image, the dimensions of which are of the relative ratio of about 3:1, considerable film area is wasted. This film wastage will be understood from a realization that thirty-five millimeter (35 mm.) film and conventional projector mechanism provide a possible frame area between the two series of sprocket holes of about three quarters of an inch (0.750") high and nine hundred and ninety-nine thousandths of an inch (0.999") wide and it is conventional to make such frames about six-tenths of an inch (0.600") high and about eight hundred and twenty-five thousandths of an inch (0.825") wide, which provides a ratio of 4:3 of the dimensions of the picture image. However, currently very few theaters have screens which will accommodate picture images of a 4:3 ratio, it being conventional now to use screens which will conveniently accommodate picture images of ratios in the range of about 1.66:1 to 1.86:1 which respectively require images at the projector aperture having dimensional ratios of four hundred and ninety-six thousandths of an inch (0.496") high by eight hundred and twenty-five thousandths of an inch (0.825") wide and four hundred and forty-three thousandths of an inch (0.443") high by eight hundred and twenty-five thousandths of an inch (0.825") wide. In order to achieve the desired ratio of picture image dimensions of about 3:1 a film of eight hundred and twenty-five thousandths of an inch (0.825") wide would require a height of about two hundred and seventy-five thousandths of an inch (0.275"), which involves loss of about two thirds (2/3) of the valuable film frame area and of the light. The differences between a possible height of seventy-five hundredths of an inch (0.750") and such film image heights of four hundred and ninety-six thousandths of an inch (0.496") and four hundred and forty-three thousandths of an inch (0.443") represent longitudinal film losses of two hundred and fifty-four thousandths of an inch (0.254") or three hundred and seven thousandths of an inch (0.307") per frame; and there is attendant light loss due to the need for accommodating these reduced heights by blocking out of some of the light from the light source which is capable effectively of operating through an aperture of a dimensional ratio of 1:1.

It is among the objects of the present invention to provide a relatively simple, much less costly projection system which will give very clear peripheral images and pictures, and will not require difficult adjustments and special theater constructions.

Another object is to provide a relatively simple wide screen projection system which may be readily focused and framed, in which the amount of light available will be sufficient to give the high clarity of light desired and which does not require a plurality of operators to control with great difficulty a plurality of films, since this system requires control of only one film and use of only one projector.

An additional object of the present invention is to provide a wide screen projection system which will readily adapt itself to standard theater construction and to readily available screens and which also may be projected from a printed or reproduced film without practice of special, difficult, costly and expensive techniques.

A further object of the invention is to provide a special lens system that may be easily fitted to a projector of standard construction provided with a revised gate aperture to project simultaneously from a split image film, i.e., a film having a pair of side-by-side series of successive frame sections in which complementary portions of the composite images are carried, the complementary split image portions in certain manner effectively to assemble them in proper complementary order on the screen with correct matching.

The invention also has for an object the provision of an effective method of projecting wide screen motion pictures from positive projection film carrying in longitudinal rows different parts of the composite image by optically transferring to a real image plane remote from the film an image of each film frame and there splitting each frame image into parts, and then projecting by separate beam subdivisions the separated image parts along separate paths to a screen for side-by-side matching on the latter of the image parts to form the composite picture image.

A still further object of the invention is to provide in an embodiment of the system an unique optical structure to be employed as a lens unit which will project simultaneously head-to-head or toe-to-toe complementary split image portions from a single split image film to a remote image plane, effectively there separate the image portions, suitably erect the separated image portions and efficiently assemble the erected separate image portions on the screen in an acceptable composite picture image.

Yet another object of the present invention is to provide in such unique optical structure effective masking means which efficiently decreases the light intensity in the zones of the image sections which are to be joined by overlapping, such masking means effectively varying rapidly the widths of the partially masked lapping zones to fluctuate the margins thereof in a manner to make the lapped zones efficiently indiscernible at the normal speed of projection of images.

Also an object of the present invention is the provision of structural embodiments of optical apparatus thereof which are readily constructed and allow efficient use and practice of the invention by personnel trained in conventional practice while necessitating little skill in attaching such optical apparatus to existing projectors and in adjusting to the conditions encountered in the theaters in which they are to be installed.

Other objects of the invention will in part be obvious and will in part appear hereinafter.

The invention accordingly comprises the several steps and relation of one or more such steps with respect to one or more of the others, an unique split image projection system for practicing such steps, and apparatus embodying the features of construction, combinations of elements, and arrangements of parts which are adapted to effect such steps, all as hereinafter described and exemplified in the following detailed disclosure, the scope of the embodiments and employment thereof being indicated in the claims.

For a fuller understanding of the nature and objects of the invention reference should be had to the following detailed description taken in connection with the accompanying drawings, in which:

Fig. 1 is an elevational view of the proximal or inlet back end of an image splitting portion of an embodiment of the optical device of the present invention;

Fig. 2 is an elevational view of the distal or outlet front end of the structure shown in Fig. 1;

Fig. 3 is a side perspective view of the device shown in Figs. 1 and 2;

Fig. 4 is an axial section of the Figs. 1 to 3 incl. structure, taken substantially on line 4—4 of Fig. 3 and viewed from below;

Fig. 5 is a perspective view of a holder employed for mounting each of the pair of inlet prisms of the Figs. 1 to 4 incl. structure;

Fig. 6 is an elevational view of the outlet end of one of the pair of outlet refracting prismatic achromats of the Figs. 1 to 4 incl. device;

Fig. 7 is a sectional view taken substantially on line 7—7 of Fig. 6;

Fig. 8 is an elevational view of the proximal or inlet front end of the one of the pair of inlet prisms which is located on the right side of Fig. 1, indicating the path of an axial ray therethrough;

Fig. 9 is a side view of the inlet prism shown in Fig. 8, as viewed from the position of line 9—9 thereof, with the path of the axial ray therethrough being indicated;

Fig. 10 is another side view of the Fig. 8 inlet prism, as viewed from the position of line 10—10 of Fig. 8, the path of the axial ray therethrough also being illustrated;

Figure 17:
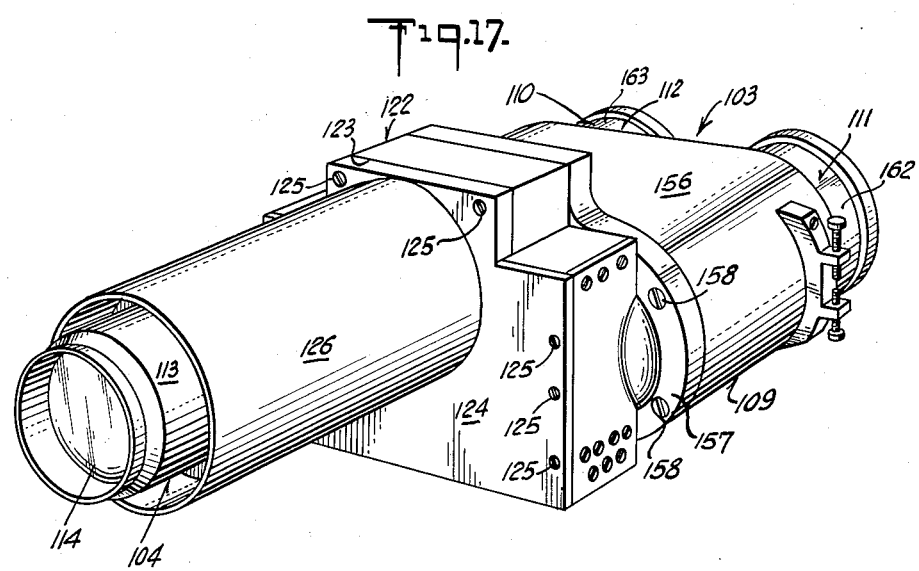
Figure 18:
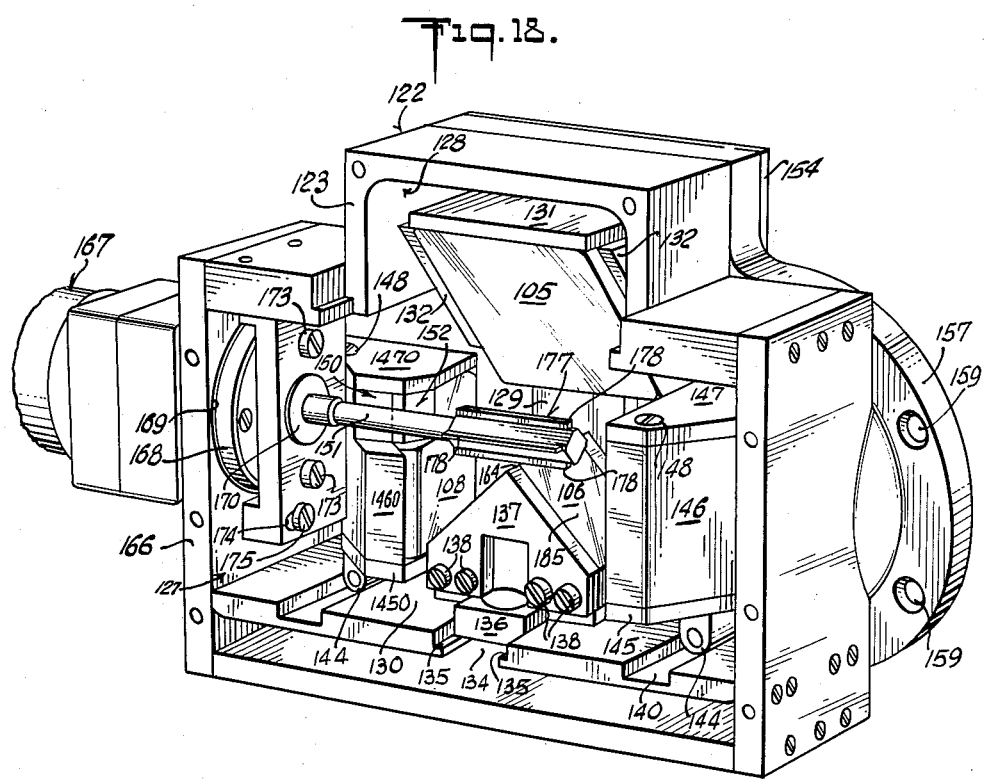
Figure 19:
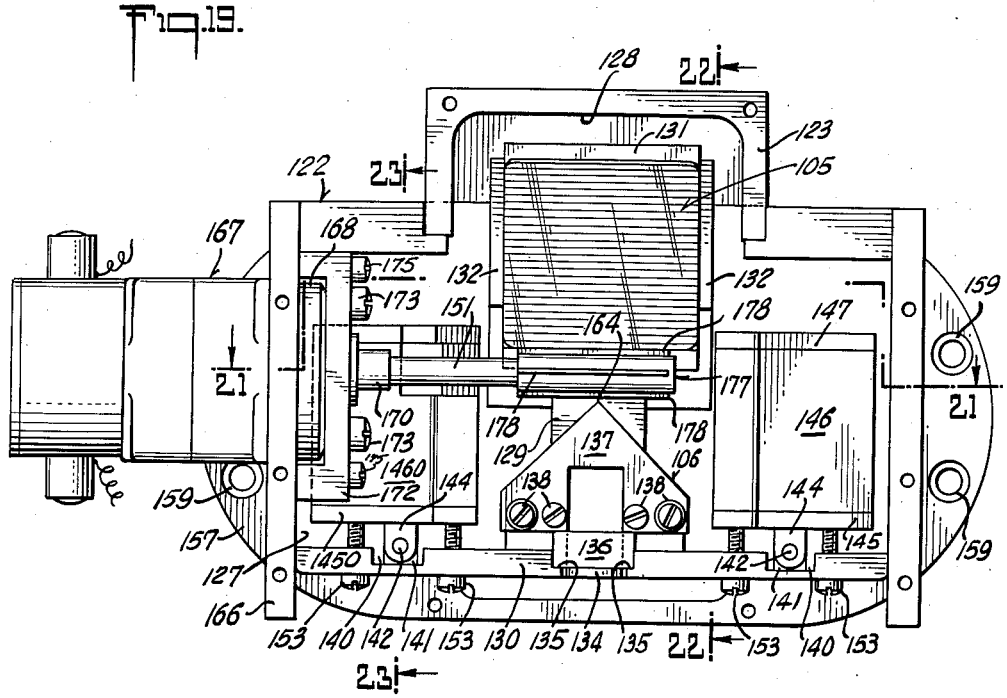
Figure 20:
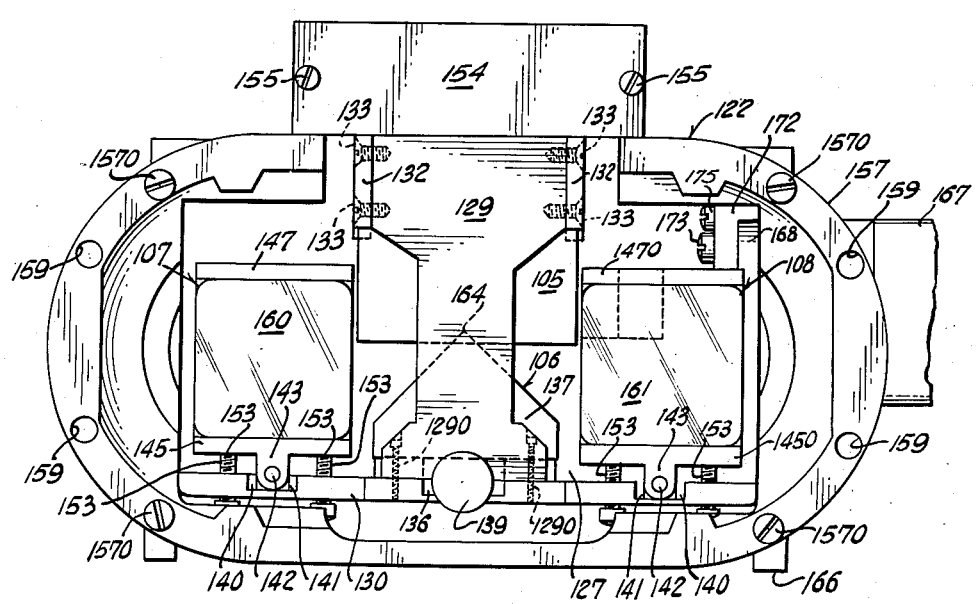

Fig. 11A is a side elevational view of the structure shown in Figs. 1 to 4 incl. showing it mounted to a preceding part, depicted in axial section, in the form of real image transfer positive lens means to complete an embodiment of the invention suitable for substituting for the conventional lens structure of a projector, the relation thereof to the positive film being translated in the projector being indicated;

Fig. 11B is a schematic diagram of an embodiment of the projection system of the present invention employing the equipment of Fig. 11A with a conventional projector for projecting wide screen motion pictures;

Fig. 11C is an enlarged axial section of an ideal form of real image transfer positive lens means, herein termed "relay lens means," which may be used in the Fig. 11A embodiment or that depicted in Figs. 15 to 23 incl.;

Fig. 11D is a diagrammatic layout to distorted scale of a portion of an embodiment of the projection system of the present invention which employs the optical structure of Figs. 1 to 10 incl., parts of which are illustratively shown in axial section as viewed from above and behind the screen, with suitable image transfer means such as that illustrated in Figs. 11A and 11B, or in Fig. 11C;

Fig. 12 is a plan view of a piece of special split image negative film from which is to be made in conventional manner a split image positive film of the projection print type adapted to use in the present system, which may be prepared from conventional films of the types illustrated in Figs. 13 and 14;

Fig. 13 is a plan view of a piece of standard projection film which may be a sixty-five millimeter (65 mm.) film, showing a frame thereof bearing a composite image to be projected and from which the special split image negative film of Fig. 12 may be prepared for use in the present system;

Fig. 14 is a plan view of a piece of "Vistavision" thirty-five millimeter (35 mm.) projection film of a double pull down type which bears successive complete images in a series of elongated frames arranged successively side-by-side longitudinally of the film, from which the special split image negative film of Fig. 12 may be made for making the split image projection print for use in the present system;

Fig. 15 is a schematic diagram in perspective of another embodiment of the present system, showing representations of the optical elements of another lens unit, a section of the projection film and the screen to which the composite picture image is to project being illustrated;

Fig. 16 is a diagrammatic layout of the image portions as they may appear at various locations of the optical elements of the Fig. 15 system when viewed from behind the projector;

Fig. 16A shows the composite image which is to be projected by the system of Figs. 15 and 16, as it may appear in a frame of a conventional film;

Fig. 17 is a perspective view of the proximal or inlet end of the optical unit or assembly embodying the system elements of Fig. 15, the rotary mask driving motor thereof being removed;

Fig. 18 is an enlarged perspective view into the inlet end of an intermediate section of the apparatus shown in Fig. 17 which houses reflective and masking elements thereof, the inlet lens and the outlet lens sub-assemblies being removed therefrom and with parts broken away;

Fig. 19 is an elevational view of the inlet end of the intermediate housing section shown in Fig. 18, with parts omitted for clarity;

Fig. 20 is an elevational view of the outlet end of the intermediate housing section shown in Fig. 19;

Fig. 21 is a lateral section taken substantially on line 21—21 of Fig. 19, indicating in dotted lines parts of the inlet and outlet lens structures to be mounted thereto;

Figs. 22 and 23 are vertical sections respectively taken substantially on lines 22—22 and 23—23 of Fig. 19;

Fig. 24 is a perspective view of a modified form of common oblique reflector shown in Figs. 15 and 18 to 22 incl., indicating pivotal mount thereof on the longitudinal axis for lateral swing;

Fig. 25 is an enlarged transverse section of the rotary masking element shown in Figs. 18, 20, 21 and 22;

Figs. 26 and 27 are transverse sections similar to Fig. 25 of modified forms of the rotary masking element;

Fig. 28 is an enlarged diagrammatic illustration of the masking action of the masking element of Figs. 15, 18, 19, 21, 22 and 25 when rotated in an edge of the field of illumination or projected image beam carrying the split image portions of the projection film or print; and Fig. 29 is a diagrammatic perspective of the lamp house of a conventional projector, with parts broken away, to which the unit assembly of Figs. 17 to 23 incl. is to be mounted in substitution for the conventional projector lens, showing the gate aperture and indicating a piece of the special film used in the present system being translated down past the gate aperture, the distance between the latter and the film being exaggerated for clarity.

Referring to the drawings, in which like numerals identify similar parts throughout, one embodiment of the optical apparatus and system of the invention will be seen in illustrative form in Figs. 1 to 11D inclusive. Referring particularly to Figs. 1 to 4 incl., there is shown an optical sub-assembly employable in an optical structure for use in an embodiment of the system of the invention, this sub-assembly including a tubular element or barrel A, that may be about four inches (4″) in diameter because of the shape and dimensions of some parts of standard projection equipments to which it may be mounted, carrying at its proximal or inlet end a pair of special, reversely duplicate prisms B1 and B2 which simultaneously separate and rotate portions of an image and split a common light beam carrying them, with a pair of intermediate projecting or objective lens means C1 and C2, a pair of final outlet optical refracting prismatic achromats D1 and D2. These image separating and beam splitting prisms B1 and B2 are held in a pair of reversely like bottom receptacles or holders E1 and E2, and a pair of reversely like top receptacles or bracket plates F1 and F2, and they are adjustably mounted on the inlet end of the tubular member or barrel A.

In the lens system or optical sub-assembly shown in Figs. 1, 3 and 4 the optical element illustrated in Figs. 8, 9 and 10 is the right side one B2 of a pair of the reversely like, image portions rotating and separating prisms B1 and B2, each having a silvered, reflective, oblique forward face 30, similarly silvered and reflective oblique bottom face 35 and angular side face 37, a flat inlet face 31 and a flat outlet face 32 parallel to the latter. The inlet face 31 of prism B2 therein shown is partly covered by the bracket plate 33, constituting the top receptacle F2, which also has a downwardly sloping portion 34 to protect and cover silvered oblique face 35 of the prism. The inlet prism B2 has adjacent the silvered angular side face 37 a rear face 36 both of which are covered by the bracket plate 33 and structure of receptacle or holder E2. Each bracket plate 33, F1 or F2, is held in position by screws 39 and 41 which respectively extend through flanges 38 and 40 into internally threaded holes in the base receptacle or holder, E1 or E2, over which it is mounted, and each holder is adjustably mounted upon proximal end 50 of the tubular member A.

Each of the pair of base receptacles or holders E1 and E2, the right side one E2 of which is shown in Fig. 5, has a base plate 51 with a window or through opening 52 therein, and is provided with a ledge 53 which carries or against which seats the top portion of distal outlet face 32 of the prism B2 nested therein. Side walls 54 and 55 of holder E cover the back and side faces 36 and 37 of the prism B2. A downwardly-projecting lug 56 on the bottom edge of holder base plate 51 has a transversely-extending slot 57 therein which receives therethrough a headed screw 58 threadably engaged in an internally threaded hole in tube end wall 50, so that each receptacle E1 or E2 may be fixed in adjusted transverse position. Each receptacle or holder E1 or E2 also has an upwardly-extending flange 59 projecting from base plate 51 and in which is provided a transversely-extending slot 60. A headed screw extends through slot 60 also into an internally threaded hole in end wall 50. The slots 57 and 60 and the screws 58 and 61 provide mounting means for prism holders E1 and E2 which permit desired transverse adjustment thereof and fixing in adjusted positions.

As will be seen from Figs. 4 and 7 each of the pair of outlet refracting prismatic achromats D1 and D2 is an assembly of a main refracting prism element 75, having an inlet face 76 and an outlet face 77, and a thinner more acute refracting prism element 78 having an inlet face 79 and an outlet face 80 abutted against inlet face 76 of main prism element 75. The pair of refracting prismatic achromats D1 and D2 are held in a pair of cylindrical holder tubes 81 which meet tangentially at 82 and have forwardly-projecting legs 83, as will be seen from Figs. 2 and 4. Each tube 81 has shoulders 84 and 85 which may constitute portions of an angularly disposed annular land, against which a circumferential zone of inlet face 79 of inlet refracting prism element 78 seats. A circumferential zone of the outlet face 77 of each outlet refracting prism element 75 is abutted by a ring 86 which is held in position by an externally-threaded ring 87 screwed into tube 81, filister slots 88 in the latter enabling the rotation thereof, thereby firmly clamping the achromatic refracting prism elements against shoulders 84 and 85.

Each objective lens sub-assembly of the pair thereof C1 and C2 may comprise three lens elements U, V and W suitably carried by a sleeve 89, as will be seen from Fig. 4, slidably mounted in one of a pair of longitudinally-extending bores 90 in barrel A, as will be seen from Figs. 1, 3 and 4. The barrel A is provided with a pair of longitudinally-extending side slots 91 through which the lens sleeves 89 are accessible. One of a pair of focusing devices, each including a knob 11, extends through each slot 91 for adjusting by sliding motion the axial position of each lens sub-assembly C1 or C2 relative to a real image plane of preceding optical means interposed between film track structure and the end panels 33 of the brackets F1 and F2, so as to permit independent adjustment of the focus of each lens sub-assembly. Adjustment means 12 is associated with each of the optical refracting prismatic achromats D1 or D2 and is accessible through one of the slots 91 to effect limited rotary adjustment of each achromat to permit adjustment of each half part image for adaptation of the projection thereof to the height or pitch, the angle determined by the pitch and throw, and the curvature of the screen and its size, which are structural characteristics of a particular theater in which the system of the present invention is being installed. For critical adjustment of each of the refracting prismatic achromats D1 and D2 a conventional micro-screw adjustment means may be employed.

In order to employ the optical sub-assembly shown in Fig. 3 as part of the lens structure of an otherwise conventional projector designed to use thirty-five millimeter (35 mm.) film a special split image projection print or film must be made from a special split image negative film, a section of which is illustrated in Fig. 12. From this split image negative film as many split image positive prints as desired may be made with the split images applied to each frame, either by conventional optical or contact printers, or by the matrices process. Since such positive prints will be printed from the split image negative in the conventional manner of printing normal projection prints there is no increase in the cost of performing the positive printing process. It has been found to be most satisfactory to provide for an embodiment of the invention as the novel film or print a thirty-five millimeter film (35 mm.) with frames of a dimension of one inch (1.00") in width and seventy-two hundredths of an inch (0.720") high carrying the double or multiple image parts to give a wide screen ratio of dimensions varying from 2.5:1 up to 3.0:1. For use in practice of the present invention normally the image parts of the split composite picture are printed in the successive frames of the novel film toe-to-toe with dimensions of about seventy-two hundredths of an inch (0.720") in width (frame height since they are rotated 90° thereon) and about a half an inch (0.500") high (one half the frame width) to give a full picture image having the dimensions of one and forty-four hundredths of an inch (1.440") wide and a half inch (0.500") high.

A standard sixty-five millimeter (65 mm.) negative film, a section of which is illustrated in Fig. 13, may be employed for the preparation of the special split image negative film of Fig. 12, although other standard width negative film may be used for the purpose of producing the split image negative film, such as fifty-five millimeter (55 mm.) film, "Technirama" film, etc. The frame area of the standard sixty-five millimeter (65 mm.) film illustrated in Fig. 13 carries a composite image Q comprising a pair of image portions respectively depicting one of two human figures J and K appearing to stand side-by-side and located on opposite sides of the center line N between the marginal perforated zones P having the pull down and sprocket teeth holes. The figures J and K are in their upright positions longitudinally of the film, i.e., the picture image extends transversely across the film, so that their toe portions T' and T are on the leading part of the frame and their head portions H' and H on the trailing part of the frame. These figures J and K appear respectively in the left and right half sections of the frame L and R and the image portions respectively appearing in these sections of the frame Q on opposite sides of the center line N constitute split or half image portions which are to be split printed on the special split image film used with the projection system of the present invention. The split image negative film of Fig. 12 is prepared by first printing a one half section of a composite picture image on one half or the side zone intervening center line N' and one of the marginal sprocket hole zones P' of a thirty-five millimeter (35 mm.) film and then printing the other half section of the composite picture image on the other half or the other side zone intervening the center line and the other marginal sprocket hole zone. This is done in a manner so that each of the half image portions J and K are rotated through 90° whereby they are arranged side-by-side in the frame in either head-to-head or toe-to-toe relation, preferably the latter. As is illustrated by way of example in Fig. 12 the half image portions J and K may be arranged toe-to-toe so that the toe portions thereof T' and T are juxtaposed to center line N' and their head portions H' and H are juxtaposed to the marginal sprocket hole zones P'.

The split image negative film of Fig. 12 is viewed therein from its Celluloid or slick side opposite its emulsion side, the latter in printing the split image positive film therefrom being faced toward the emulsion side of the positive film in conventional manner, and thus when the positive film is translated down past the apertured gate of the projector with its slick side sliding across the gate its emulsion side will be faced forward with the right half image portion R in the right side frame section and the left half image portion L in the left side frame section as viewed from the slick side of the positive film, i.e., from behind it in the position of the projector light source.

In making the split image negative film of Fig. 12 from the projection film of Fig. 13 the latter is translated in one direction during printing at 90° transverse to the moving negative film to register on the latter, in one of the half frame zones flanking one side of center line N', half image portions J, and then in the reverse direction to register on the negative film, in the other half zone flanking the other side of the center line, half image portions K. Each of the resulting frames carrying the composite image Q' may have a total frame width of about one inch (1.00"), indicated in Fig. 12 at G, and a frame length of about three quarters of an inch (0.750"), indicated at M. The difference between three quarters of an inch (0.750") and seventy-two hundredths of an inch (0.720") in width of half image portions allows desirable separation between successive frames.

The split image negative film of Fig. 12 may be made from a double pull-down thirty-five millimeter (35 mm.) "Vistavision" projection film, a section of which is illustrated in Fig. 14 in whch it is indicated that the length of a frame, in which the half sections carrying half image portions L" and R" are arranged side-by-side longitudinally of the film, may be about one and forty-four hundredths of an inch (1.440"), and the width thereof, in the direction in which the vertical dimensions of the image portions extend, may be about eight hundredths of an inch (0.800"). Such "Vistavision" positive film of Fig. 14 is first run through a suitable printer with its longitudinal axis aligned with the longitudinal axis of the negative thirty-five millimeter (35 mm.) film and in the opposite direction of travel of the latter to print in one side zone of the frames of the latter one half of each frame of the former with rotation through 90° in one direction, and then is run back through in a reverse direction to print the other half of each positive frame in the other side zone of the frames of the negative with rotation through 90° in the opposite direction. Such split printing causes cropping of about one-eighth of an inch (⅛") from each side of the negative half image portions as is indicated at 92, since the composite negative image, comprising half image portions L" and R", is too wide to register the full extent of the half image portions thereof at L' and R' in each frame of the Fig. 12 negative film.

In projecting composite picture images to a theater screen, such as the curved screen Y indicated in Fig. 11D, from a special split image positive film printed from the split image negative film of Fig. 12, a conventional projector having an enlarged gate aperture and an optical device in which is incorporated the optical sub-assembly of Figs. 1 to 4 incl. substituted for its conventional projection lens unit may be employed. An optical device which may be provided for this purpose is illustrated by way of example in Fig. 11A. As is there indicated it may comprise a preceding tubular structure or barrel 42 having an enlarged distal end 43 provided with a counterbore 44 into which the proximal end of the tubular member or barrel A is socked. Filler pieces 45 and 46 are mounted in the counterbore 44 to fit in complementary fashion the flatted sides 47 and 48 of barrel A to prevent relative rotation, and suitable clamping means, such as set screw 49 may be provided to clamp these barrels together in predetermined relative radial positions. The barrel 42 has its proximal end 62 of such shape and dimension as to be readily mountable in the holder of the projector for the conventional projection lens unit in a predetermined relative radial position. Within bore 63 of barrel 42 is suitably mounted a real image transfer positive lens means ITL, indicated illustratively at 64 in Fig. 11A as a single positive lens although it may be provided as an assembly of a plurality of glasses, and such lens means may, if desired, be so mounted therein in conventional manner to be axially adjustable. The real image transfer positive lens means ITL will have its mounting at 64 so related to the separating prisms B1 and B2 in the holders E1 and E2 and brackets F1 and F2 carried by the proximal end of barrel A as to have its forward conjugate point located at the inlet faces of the separating prisms when its back conjugate point is located at the film path. In Fig. 11A the path of the positive film is indicated at S, and the split image portions borne by the film are located thereat in a first image plane IP1 at the back conjugate point of real image transfer positive lens means ITL. Consequently, a real image plane IP2 remote from the film path at IP1 is provided beyond or in front of the transfer lens means ITL at its forward conjugate point where the inlet faces 31, 31 of separating prisms B1 and B2 are located. It will be understood from the diagrammatic showings in Figs. 11B and 11D, and the ray diagrams in Figs. 8, 9 and 10 that the resulting projection system operates in the following manner.

The conventional light source of the projector, illustrated at 199 in Fig. 11B, which may be of the usual carbon arc type conventionally backed by a concave reflector and having a condenser lens in front thereof, will be positioned in the usual manner behind film gate 65 having an aperture 100. Immediately in front of the gate 65 conventional film track and translating equipment guide and transport the positive film 101 in the path S with the emulsion side forward and with the images in the frames thereof located in a primary image plane IP1. As has been previously explained, the positive projection film 101 has a succession of frames constituting parallel longitudinally-extending rows of frame sections with the sections of each frame carrying different parts of a composite image arranged therein at 90° rotation from normal disposition, preferably each frame being subdivided into a left half section "Frame Section 1" and a right half section "Frame Section 2," each bearing a split image portion constituting at least one half of a composite picture image, the image part or portion in each of the sections of each frame having a side-joining margin with the image parts or portions in one longitudinal row of frame half sections having relative orientations with respect to the image parts or portions in the adjacent longitudinal row of frame half sections of one of the relations toe-to-toe and head-to-head. Preferably the split image parts or portions are arranged in the relative orientations of toe-to-toe with the left image portion in Frame Section 1 and the right image portion in Frame Section 2, and thus they have their side-joining margins substantially transversely aligned in the leading or lower portion of each frame. The common beam of light which is transmitted through the gate aperture 100 and each frame of the positive projection film 101 projects forward a complete image of each positive projection film frame through the real image transfer positive lens means ITL at 64 with rays of the image passing through the first principal focus f1. Beyond the image transfer lens ITL rays of the image pass through the second principal focus or focal point f2 and a real image is formed at the forward conjugate point in the secondary real image plane IP2 of the film borne image at the back conjugate point in the primary image plane IP1. As has been previously indicated, the inlet faces 31, 31 of the reversely like beam splitting and image separating prisms B1 and B2 are located at this real image plane IP2, which is remote from and appreciably forward of the apertured gate, the film, the film track and film translating equipment of the projector, where it is convenient to mount and employ elements of equipment of the present invention without physical interference with the projector mechanism, where the beam splitting and image parts separating means are free from any possibility of being in contact with the moving film to scratch it, and remote from the high heat of the projector light source (which may be of the order of about 1200° F. to 1500° F.) that may have a tendency to damage or crack prisms if employed for the beam splitting and image separating function.

The inlet prisms B1 and B2 split the common beam at the remote image plane IP2, laterally separate the beam subdivisions with each carrying only a split image portion, i.e., the image part or portion registered on one of the pair of half frame sections (Frame Section 1 and Frame Section 2), respectively at 14 and 16, and quarter rotate these separated image parts in the beam subdivisions for exit in reoriented condition from the exit faces 32, 32 of the prisms B1 and B2. The ray diagrams in Figs. 8, 9, 10 and 11D indicate the paths of the optical axes of the separate images of the half sections of each positive projection film frame in passage through the beam splitting and image rotating and separating prisms B1 and B2.

As has been previously indicated the positive projection film 101 may be prepared preferably to have its complementary split image parts or half image portions R and L so arranged in the two longitudinal rows of frame half sections that they are in the relative orientations of toe-to-toe with the side-joining margins of each complementary pair of half images aligned in a transverse zone of the leading portion of the frame carrying them. The half image portions R which are to provide the right half area of the screen with half of the composite picture images are carried by the right side sections (Frame Section 2) at 16 of the positive film frames and those L for the left half screen area are carried by the left side sections (Frame Section 1) at 14 of the film frames as the film 101 is viewed from behind from the position of the operator or the projecting light source. The image of each film frame as it is transferred through the real image transfer lens means ITL by a common light beam from the primary image plane IP1 at the film path to the secondary image plane, i.e., the real image plane IP2 forward of the transfer lens ITL at its front conjugate point or focal point, is rotated through 180° to be inverted with maintenance of the relative toe-to-toe relation and with the right half image portion R on the left side and the left half image portion L on the right side. Thus the inverted right half image portion R is formed by optical transfer to the remote real image plane IP2 at the vertical inlet face 31 of the left side image-separating prism B1 and the inverted left half image portion L is formed in this real image plane at the vertical inlet face 31 of the reversely like right side image-separating prism B2 of Figs. 8 to 10 incl., the optical axes of the half image portions respectively appearing at a1 and a2. By way of example and as will be seen from Figs. 8 to 10 incl., 11B and 11D, the left half image portion L is then transmitted through the right side prism B2 to its oblique forward reflective face 30 with the optical axis thereof appearing at b2 for laterally outward reflective transfer farther to the right by turn through 90°. The head portion of the left half image portion L in impinging upon the oblique forward face 30 is swung forward and inward through 45° about a vertical line element on the inner or toe side thereof at the optical axis of the prism-impinging common light beam. The left half image portion L is then reflected by face 30 with turn through 90° laterally outward to top oblique reflective side face 37 with further similar swing through 45° now to be arranged in a plane parallel to the optical axis of the common light beam, the half image portion optical axis having been laterally transmitted through right side prism B2 from point $b2$ to point $c2$. In this reflective transfer the bottom portion of the left half image portion L was swung counterclockwise laterally outward through 45° about a transverse line element thereof on the upper side in the vicinity of its side-joining margin. Oblique side face 37 of prism B2 then reflects the left half image portion L down to impingement upon reflective oblique bottom rear face 35 with further turn through 90°, transmitting the optical axis thereof from point $c2$ down to point $d2$. In this reflective transmission from side face 37 down to bottom face 35 the top portion of the left half image portion L in the vicinity of its uppermost side-joining margin as it appears at face 37 is swung counterclockwise back down on the inner side through 45° about a transverse line element in the vicinity of its lowermost portion as it there appears, now to be fully quarter rotated counterclockwise through 90° and flipped over to an upside down inverted position with its toe portion uppermost. Oblique rear bottom reflective face 35 then reflects the flipped over and quarter rotated left half image portion L forward to impingement upon exit face 32 with turn of its optical axis through 90° to be transmitted from point $d2$ through to point $e2$ in the prism exit face. In this final reflective transfer the toe of the left half image portion which is now uppermost is swung forward through 45° about a transverse line element in the vicinity of its lowermost head portion, now to appear at the exit face 32 of prism B2 in a transverse plane normal to the optical axis of the initial common beam and parallel to the remote or forward real image plane IP2, both quarter rotated counterclockwise and flipped over to an inverted position with lateral separating transfer to the right and with its side-joining margin on the inner side nearest the optical axis of the common transfer beam. Thus the split or half image portion L transmitted from the left half frame section (Frame Section 1) of the film at 14 was first rotated 180° by transmission through the real image transfer lens means ITL at 64 and quarter rotated with flip over as it passed through the right side prism B2 so as to exit therefrom upside down with respect to normal upright or erect position and reversed.

The image of the right half frame section (Frame Section 2) is in reverse fashion transmitted through the image transfer lens ITL with 180° rotation to the left side prism B1 and in similar but reversed fashion it was quarter rotated clockwise and flipped over with the optical axis ray thereof transmitted forward from entry point $a1$ to reflecting point $b1$, reflected laterally to the left to reflecting point $c1$, then reflected down to reflecting point $d1$ and finally reflected forward to exit point $e1$, so that it is transferred laterally to the left upside down from normal or erect position with its side-joining margin on its right side and nearest to the optical axis of the common transfer beam.

If the right half section (Frame Section 2) of the film, as viewed from the rear, carries an image of the right half portion R of the composite picture image and the left half section thereof (Frame Section 1) carries the left half portion L of the composite picture image, with these half image portions arranged in the relative orientation of toe-to-toe and with their side-joining margins extending transversely in the leading or bottom portion of each film frame, the left hand prism B1 receives the right half image portion R and the right hand prism B2 receives the left half image portion L, these split or half image portions then being transmitted therefrom in flipped over and laterally separated fashion, and in inverted or upside down orientation, as a result of the rotation of each half image portion through 90° in opposite directions. Proper magnification in projection and inversion of these upside down half image portions R and L is then attained by projection through suitable objective lens means or subassemblies C1 and C2, with the first being provided for the left side path and the other for the right side path, simultaneously to erect to normal dispositions and magnify respectively the laterally-separated image portions R and L. In order to project the right half image portion R in the left side path and the left half image portion L in the right side path respectively to right and left side-by-side areas of the screen Y, each objective lens arrangement of the pair C1 and C2 has associated therewith one of a pair of the laterally-spaced optical refracting prismatic achromats D1 and D2 which are positioned at the distal outlet end of the lens carrying barrel A. The pair of refracting prismatic achromats D1 and D2 criss-cross the half image portions R and L as they are projected to the screen Y, and also makes adjustment and alignment of these half image portions on the screen. Thus the pair of intermediate objective lens arrangements C1 and C2, and pair of final adjustment achromats D1 and D2 erect and magnify respectively the separated split image portions R and L, criss-cross or convergingly project them in transversely opposite directions along the optical axes RX and LX, to be reproduced in properly erect positions in side-by-side relation upon the screen Y there to form an enlarged duplication of the original composite picture image. The half image portion on each left half section (Frame Section 1) at 14 of the film (see Fig. 11B) will thus be quarter rotated back through 90°, magnified and projected in criss-cross fashion to the left side screen area 15 indicated in Fig. 11D and the right half image portion on each right half section (Frame Section 2) at 16 of the film (see Fig. 11B) will thus be quarter rotated back through 90° in the opposite direction, magnified and projected in criss-cross fashion to the right side screen area 17 also indicated in Fig. 11D, with their side-joining margins suitably aligned and joined in the vertical central area of the screen at Z, as is indicated in Fig. 11D, together to give the complete or composite projected picture image.

Since the invention may be practiced without criss-cross projection of the separated and magnified split image portions along separate generally parallel or diverging paths to the screen it is to be understood that, in such case, the plurality of left half image portions L should be printed successively in the right half frame sections 16 of positive projection film 101 and the plurality of right half image portions R should be printed successively in the left half positive film frame sections 14 in toe-to-toe relative orientations with their side-joining margins transversely aligned in the upper or trailing portions of the successive film frames. As a result, the transfer or relay lens means ITL rotates the right and left half image portions R and L which respectively are in the left and right positive film frame sections (Frame Section 1 and Frame Section 2) at 14 and 16 through 180° in transferring them forward to the forward or remote real image plane IP2, so that now they are inverted with their side-joining margins lowermost and with the right half image portion impinged upon the inlet face 31 of the right side prism B2 and the left half image portion impinged upon the inlet face 31 of the left side prism B1. The half image portions R and L respectively emerge at the outlet faces 32 of prisms B2 and B1 after being rotated through 90° in opposite directions and flipped over so that their toe portions are uppermost and their side-joining margins are laterally outermost, farthest to the sides from the common beam optical axis. Upon inversion to erect positions of these half image portions R and L as they are projected separately through a pair of laterally spaced objectives, which may be of any conventional form, they are rotated through 180° to upright positions with their side-joining margins in juxtaposed relation for medial matching on the screen as they are divergingly projected thereto in side-by-side relation. Thus the complementary and separated half image portions are projected on the screen there to form a composite picture image in the nature of a mosaic assembly of the image portions beside each other. The invention may also be practiced with the split or half image portions R and L arranged in the side sections of the positive projection film in head-to-head relation provided extra inverting lenses are used in their separate projecting paths. For example, for the system of Figs. 11B and 11D the half image portions L and R will be printed respectively in the left and right frame side sections (Frame Section 1) and (Frame Section 2) at 14 and 16 in head-to-head relative orientations with their side-joining margins in the trailing portion of each frame and an additional inverting lens will be located in each of the pair of projecting paths in association with the objective lens means and converging refracting prismatic achromats C1 and D1 and C2 and D2 therein. Criss-cross projection of half image portions with their matching side-joining margins in leading transverse zones of the projection positive film frames and in the relative orientations of toe-to-toe is preferred because of simpler lens sub-assemblies required and since better results are obtained in the matching effect produced in the medial vertical overlap zone on the screen.

The inlet prisms B1 and B2 may be adjusted laterally as needed, which is indicated by the double-ended arrows 10 in Fig. 11D, loosening of screws 58 and 61 in slots 57 and 60 of the prism nesting holders E1 and E2 permitting such transverse adjustments, the screws then being tightened to hold these prisms in their adjusted positions. The focusing knob 11 which is associated with each of the objective lens sub-assemblies C1 or C2 may be employed to focus the latter by axial motion thereof. The adjustment means 12, which is associated with each of the pair of optical refracting prismatic achromats D1 or D2 for rotary adjustment thereof will permit adjustment separately of each half image portion to secure proper relative alignment of the complementary half image portions on the screen and to adapt the projection to the height or pitch, the angle determined by the pitch and throw and curvature of the screen, depending upon the characteristics of a particular theater and its screen size.

In Fig. 11C is shown an ideal form of image transfer positive lens means which in the practice of the present invention one may prefer to employ for performing the real image transfer function of the lens means ITL at, for example, 64 in Figs. 11A and 11B and in the embodiment of Figs. 17 to 23 incl. As is indicated in Fig. 11C, such an image transfer positive lens means 104 may comprise a tubular barrel 113 having a sub-assembly of lens glasses therein in the form of an inlet converging or positive lens 114, a succeeding doublet 66 consisting of a plano-concave lens element 67 and a plano-convex lens element 68, a next succeeding second doublet 660 consisting of a plano-convex lens element 68 and a plano-concave lens element 67 (thus being the reverse of the first doublet 66), and as a final lens element a second outlet converging or positive lens 115. This is an ideal form of a real image transfer positive lens means which has a magnification factor of unity, i.e., the magnifying image size factor thereof is 1:1, and has a speed F of one (1), thus being termed herein a "relay lens means." Such relay lens means 104 has as an essential function the transferring of an image in focus from the positive projection film to a remote real image plane and there is no necessity for it performing any magnifying function, the objective lenses in the optical system beyond the beam splitting and image parts separating and rotating means performing the necessary magnification in projection. Ideally it has a speed of one (1) so that there will be no appreciable light loss in transferring the real image therethrough to a remote real image plane. Such an image transfer lens means or relay lens means has a first principal focus at 69 which is to be located in the primary image plane IP1 at the film path and a second principal focus or focal point 70 in a remote or forward real image plane IP2 where the common beam is to be split and the split image parts are to be laterally separated, such as by prisms B1 and B2 of the embodiment of Figs. 1 to 11B and 11D. It is to be understood, of course, that a variety of types of arrangements of lens glasses employing various numbers and different styles of lens elements may be assembled to serve as real image relay lens means so long as such lens sub-assembly has a magnification factor of about unity and a speed of about one (1), in which a pair of symmetrical lens systems are employed, such systems being reversed in order with respect to each other with each having a speed F value of two (2) or better. It is indicated in Fig. 11C that the lens sub-assembly thereof is made up of such a pair of reversed lens systems respectively indicated at 71 and 72 telescoped into opposite ends of the barrel 113.

In the use of the optical projecting unit assembly of the present invention, either in the form of Figs. 1 to 11A incl. or Figs. 15 to 23 incl. with the preferred use therein of relay lens means 104, in substitution for the usual projecting lens unit of a conventional projector equipped with a gate element having an enlarged aperture to accommodate the larger size of positive projection film frames a very wide angle picture is produced on the screen throughout which there is high illumination and accurate color values. High clarity both centrally and peripherally of the projected picture images is obtained. Since an aperture having the dimensions of the frame, i.e., about one inch (1.000") wide and seventy-two hundredths of an inch (0.720") high is to be employed there is more light available than with apertures of conventional dimensions of about eight hundred and twenty-five thousandths of an inch (0.825") in width by an average height of about forty-seven hundredths of an inch (0.470"), or approximately eight tenths of an inch (0.800") by six tenths of an inch (0.600").

Since the half image sections of the film frames (Frame Section 1) and (Frame Section 2) are of dimensions in width (longitudinally of the film) greater than a pair of image portions with each constituting exactly one half of the composite image, edge zones of both carry adjacent the side-joining margins or edges which are to be juxtaposed on the screen at the center thereof duplications of a central zone of the composite image. Such duplicate zones of the right and left image portions are to be overlapped to advantage in the central vertical zone of the screen for matching of image halves. In order to accommodate these overlap zones by an aperture of one inch (1.000") by seventy-two hundredths of an inch (0.720") the gate breast plate in which it is defined may be tilted slightly, e.g., with its bottom end moved back from the film about two hundredths of an inch (0.020"), which will darken the overlap zones by a partial masking effect. Except for the alteration in the aperture which may be attained by change of the apertured breast plate juxtaposed to the gate, and the substitution of the optical device of the present invention for the usual projection lens the projector mechanism may be conventional.

The terms "half image portion" and "half image portions" are used herein in the sense that each of these image portions is approximately a one half part of the composite image. It is to be understood that such a half image portion may include exactly a one half part of the composite image plus an additional joining edge strip which is a duplicate of a strip along the joining edge of the other one half part of the composite image. Thus each half image portion may have an overlap zone along its joining edge which includes a strip of the exact half image appearing therein and the adjacent strip of the other exact half image, with these overlap zones of the pair of half image portions being capable of being overlapped with exact registry of the duplicate image parts appearing therein. The terms "partial image" and "split image portion" are used herein in the same sense.

The amount of overlapping of zones of image portions in the central vertical zone of the screen can be controlled and by overlapping darker edge zones of the half image portions uniform illumination or equivalent gradual gradations thereof is assured. The same amount of light will be projected independently of slight variations in illumination source. The amount of overlap in the central vertical zone of the picture image on the screen can be controlled by framing which will usually be accomplished manually at the start of projection of a reel of film.

The split images of the thirty-five millimeter (35 mm.) print which were rotated in opposite directions through 90° in the printing of the special split image negative are projected through the parallel prism, lens and wedge arrangements described above to be rotated back through 90° in opposite directions, erected and then criss-crossed, thereby to provide a projected composite picture image with slight central overlap upon a flat or deeply curved screen without appreciable distortion, free of relative displacement between image parts and with full balance of the picture areas. The two separate objective lens sub-assemblies permit separate focusing of the image parts.

The present invention provides a novel wide screen projection system in which a single split image positive film may be employed to give a wide projected picture image after approximately half image portions in the pairs of side sections of the film frames have been rotated and criss-crossed in projection. The invention is suitable for use with deep curved screens, as well as relatively wide and flat or slightly curved screens, the curvature always being concave to the observer or theater patron. There is a particular advantage in projection upon a deeply curved screen since the composite split picture image which is projected is substantially free of distortion over its entire area even though the planar face of the curved screen, i.e., the plane in which its side edges are located, is a substantial distance forward from the center of the curved screen, normally a distance which would cause distortion without the employment of the present projection system.

Another embodiment of apparatus of the present invention is illustrated in Figs. 15 and 17 to 23 incl. which performs the method of projection illustrated in Figs. 16 and 16A in a manner which may be preferred to the use of the system of Figs. 1 to 11B incl. and Fig. 11D. The system illustrated in Fig. 15 employs to advantage the optical unit of Figs. 17 to 23 incl.

The diagrammatic perspective view of Fig. 15 illustrates at I a section of the special split image projection print or positive film 101 to be printed from the split image negative of Fig. 12 as previously explained, and from which image portions in the left and right frame sections L and R are projected through certain optical equipment to curved theater screen 102 at VIII. Projector equipment at I (not shown) will be of conventional form employing the usual film translating equipment, light source, and an enlarged gate aperture 100, diagrammatically illustrated in Fig. 29, but with the optical unit of Figs. 17 to 23 incl. fitted into its usual projector lens mount.

The optical unit illustrated at 103 in Fig. 17, which is to be fitted to the projector in substitution for its conventional lens, comprises the relay lens sub-assembly 104 of Fig. 11C at II, an obliquely arranged reflective mirror 105 at III, an image-separating reflective wedge 106 at IV, a pair of obliquely arranged left and right reflectors 107 and 108 (which may be reflective prisms or reflecting surface mirrors) located laterally on opposite sides of the wedge 106 at VL and VR, a pair of laterally-spaced conventional lens sub-assemblies 109 and 110 at VIL and VIR, and a pair of reversely-arranged, laterally-spaced, criss-crossing refracting prism wedges 111 and 112 respectively at VIIL and VIIR. The operations of these optical elements and sub-assemblies will be explained later in connection with Figs. 16 and 16A.

The real image relay lens means 104 has been previously described in the description of Fig. 11C.

Reflecting prism 107 has its rear face 116 silvered to act as a reflector and reflecting prism 108 is of similar construction.

The lens sub-assemblies 109 and 110 are preferably of conventional objective construction and each includes an erecting lens element which optically will rotate through 180° the split image portions that are transmitted therethrough. Each of the lens sub-assemblies 109 and 110 in the current operating prototype consists of a housing tube 117 in which is successively mounted a converging or positive lens and a doublet telescope objective having a double concave element and a double convex element with the latter indicated at 118 in Fig. 15 to effect the desired magnification in conventional manner.

The relay lens sub-assembly 104 is movably mounted for axial motion to permit focusing, as is indicated by the double-ended arrow 119 in Fig. 15. Each of the objective lens sub-assemblies 109 and 110 are likewise mounted for axial adjustment to attain independent focusing, as is indicated by the double-ended arrows at 120 and 121.

By reference to Figs. 17 to 23 incl., it will be seen that the embodiment of the optical unit 103, which has proven to give the desired unique results, is of the following construction. An intermediate frame section 122 has mounted to the inlet end 123 thereof a face plate 124, preferably secured by a plurality of screws 125—125. The face plate 124 carries lens sub-assembly housing 126 in which real image relay lens sub-assembly 104 is movably mounted for axial focusing movement by any suitable means, such as screw threads. The lens housing 126 is of such dimensions that it can be readily mounted on the lens mount of the conventional projector apparatus in similar manner of the mount of and in substitution for the conventional projector lens.

Chamber 127 of intermediate housing 122 has a top recess 128 in which oblique reflector 105 is suitably supported by bracket means which may comprise an upright arm 129 mounted upon chamber base plate 130 by a pair of screws 1290, 1290. Upright bracket arm 129 carries a top bracket plate 131 and a pair of side bracket flanges or arms 132, 132 fastened to the upright arm by any suitable means, such as screws 133—133, as will be noted from Figs. 18 to 22 incl. Top plate 131 may be secured to the upright bracket arm 129 by a plurality of screws, such as that indicated at 1310 in Fig. 22. As will be understood from Fig. 15, the optical axis of relay lens sub-assembly 104 is substantially aligned with the center of oblique reflector 105.

Chamber base plate 130 is suitably medially slotted at 134 with the side walls of the slot rabbeted to provide track ledges 135, 135 on which slides a glide bar 136. Glide bar 136 carries triangular end plates 137, 137 by means of screws 138—138 between which is clamped image-separating reflecting wedge 106. Glide bar 136 may be adjusted along the tracks 135, 135 by means of an adjusting screw 139 rotatably carried by fixed bracket arm 129, to adjust the separating wedge 106 relative to oblique reflector 105. This structure will be best understood from Figs. 18 to 21 incl.

Base plate 130 is provided with a pair of laterally-spaced grooves 140, 140, located on opposite sides of the slot 134, in each of which is mounted a hinging eye 141 receiving therethrough a hinge pin 142 mounted in apertured ears 143 and 144 (Fig. 23). Rocker base plate 145 which supports reflecting prism 107 is carried by the pair of apertured ears 143 and 144, and is located on the right side as one looks into the inlet end of the intermediate housing 122, and rocker base plate 1450 upon which reflecting prism 108 is seated is located upon the left side thereof, as viewed in Figs. 18 and 19. Rocker base plate 145 has fixed thereto by suitable means, such as screws, an upright oblique wall 146 on which is mounted a top plate 147 by any suitable means, such as screws 148, 148, together to form a housing for reflecting prism 107 with the back face 149 thereof which is abutted to the inside face of upright wall 146 being silvered for reflecting purposes. The other rocker base plate 145O also supports an oblique upright wall 146O which carries a top plate 147O and together these form a housing for reflecting prism 108 having its back surface 149O also silvered for reflective purposes. The upright wall 146O and top plate 147O are notched or cut away at 150 so as not to interfere with rotary shaft 151, the function of which is later explained. Top inside corner 152 of reflecting prism 108 is likewise notched back for a similar purpose, all as best seen in Figs. 18 and 21.

Each of the rocker base plates 145 and 145O is associated with suitable means to clamp it in any angularly adjusted position permitted by the hinge mounting at pivot pins 142, 142. Such means may comprise for each of rocker base plates 145 and 145O a pair of set screws 153, 153 threadably mounted through mounting base plate 130 with their top ends bearing against the bottom face of the rocker base plates. Accordingly, the angular position of either of the reflecting prisms 107 and 108 may be adjusted by loosening one of the screws 153 bearing against the bottom face of its supporting rocker base plate and tightening up on the other to clamp it in the adjusted angular position, which will be understood from Figs. 19 and 20.

The top recess 128 of chamber 127 in intermediate housing 122 is closed off in the front or on the outlet side by a face plate 154 suitably held in position by screws 155, 155, as will be understood from Figs. 20 and 22.

A lens and prismatic achromat housing 156 is mounted to the outlet side of intermediate housing section 122 by intervening flange plate 157 fixed to the latter by suitable fastening means, such as screws 1570–1570 (Fig. 20), and screws 158—158 fasten housing 156 to flange 157, as will be understood from Figs. 17 and 21, holes 159—159 for which are shown in Figs. 18 to 20 incl. Housing 156 has a pair of parallel bores which are internally threaded, threadably to receive the erecting objective lens sub-assemblies 109 and 110 with their axes aligned with central portions of the outlet faces 160 and 161 of reflecting prisms 107 and 108. By virtue of the screw-threaded mounting of the erecting objective lens sub-assemblies 109 and 110 in housing 156 they are axially adjustable to attain independent focusing thereof.

The refracting prismatic achromats 111 and 112 are indicated in the diagrammatic lay-out of Fig. 15 as rectangular elements in order to assure a ready understanding thereof, but in the structural embodiment illustrated in Figs. 17 to 23 incl. they are circular in plan view and are respectively carried by suitable casing tubes 162 and 163, as indicated in Fig. 17, which have external threads threadably received in the outlet ends of the internally threaded bores in casing 156. Such rotatable mounting of the prismatic achromats 111 and 112 permits rotary adjustment thereof as to their criss-crossing effect in transmitting erected image portions to the screen 102.

As is previously indicated, the split or half image portions which are carried by separate side sections of each film frame have duplicate zones which are to be overlapped in the central vertical zone of the screen. In order to avoid excessive illumination in this overlapped zone of the picture image on the screen, which would make it quite apparent, the amount of illumination or the density of the light in these marginal zones of the half image portions is reduced by unique masking means which is located in the vicinity of an image plane, such as the forward focal plane IP2 of the relay lens means 104. Film 101 is located at the back focal plane IP1 of relay lens means 104 and the top edge 164 of the separating prism 106 is located at the forward focal plane IP2 thereof, and the focal distance to the latter has been greatly exaggerated in Fig. 15 merely for purposes of clarity. One improvement of the embodiment of the present invention illustrated in Figs. 15 to 23 incl. resides in the provision of such masking means in a form which rapidly varies the width of the masked zones so as to fluctuate the darkened areas of the overlapped zone in the central vertical zone of the screen, in order to reduce or eliminate conscious observation thereof.

Such masking means is embodied in the apparatus of Figs. 17 to 23 incl. in the form of a rotary radial blade masking means or paddle shutter. End plate 166 of intermediate housing section 122 has mounted externally thereof a suitable high speed electric motor 167, speed controlled by suitable conventional variable resistance means (not shown). Motor 167 drives rotary mask shaft 151, as will be understood from Figs. 18 to 23 incl. Inner end 168 of motor 166 projects with clearance through a hole 169 in end plate 166. Bearing 170, through which rotary mask shaft 151 extends, is fixed on the motor inner end 168 and is snugly supported in a through hole 171 in a channel bracket 172 fixed by screws 173, 173 to the motor inner end. The top and bottom ends of channel bracket 172 have lateral slots 174, 174 therein in which are received screws 175, 175 anchored in internally-threaded holes in housing end plate 166. Leakage of light through the hole 169 into chamber 127 is of no importance since the intensity of light in a projection booth is low but ingress of dust may be desirably prevented by suitable resilient packing or sealing means 176, indicated in Fig. 21, which will permit lateral movement of the motor inner end 168 therein with adjustment of mounting bracket 172. Motor 167 may be protectively housed in a large cup shield fixed to housing plate 166. Consequently, the location of the rotary mask 177 carried by shaft 151 on the approach side of image-separating wedge 106 may have its transverse position along the edge 164 of this image-separating reflecting wedge adjusted by loosening the screws 175, 175, sliding the channel bracket 172 laterally as permitted by the slots 174, 174, and then tightening these screws, thereby adjusting the width of the masked zone in the image parts, as will be explained later.

Rotary radial blade mask or paddle shutter 177 which is fixed on the end of shaft 151, such as by being made integral therewith, is provided with a plurality of radial, longitudinally-extending fins or blades 178—178 which may be as few as two and as many as eighteen. In the embodiment illustrated in Figs. 17 to 23 incl., such blades 178—178 are four in number and their function is explained hereinafter. In Fig. 25 a cross-section of such rotary mask 177 is illustrated to an enlarged scale and Fig. 26 shows such a rotary mask 277 provided with three such radial blades 278—278. It will be noted from Figs. 25 and 26 that the axial cores of the rotary masks 177 and 277 are flatted off on the sides respectively between the radial blades to prevent interference with the proper masking effect by rays which tend to be reflected from intervening curved surfaces when the cores are cylindrical and located in or near an edge of the field of illumination. In Fig. 27 is shown such a rotary mask 377 provided with eight such radial blades 378—378. When the radial blades are made radially longer, as in the Fig. 27 embodiment, so as to permit its core to be offset to one side of the oncoming beam or field of illumination at an appreciable distance, the precaution of flatting off sides of the core of the rotary mask need not be taken. It will be noted by a comparison of Fig. 27 with Fig. 25 or Fig. 26 that the outer edges of the blades or rotary masks having a larger number of blades are thinner than those having a fewer number of blades so as to insure the best attainment of the desired fluctuating effect described later in connection with the description of the function of such rotary masks.

In use and operation of the optical unit 103 on a standard projector in substitution for its conventional lens, let it be assumed that the projector is loaded with a positive film or projection print made from the split image negative of Fig. 12, which will be a standard thirty-five millimeter (35 mm.), four perforations pull-down type differing only in the printing of complementary portions of the picture image in the two sections of each frame on opposite sides of the center line. For example, as is indicated in Fig. 15, such film 101 has a partial image or split image portion in its frame section 179 which is to form the left half of the picture image projected on the screen and another partial image or split image portion in its section 180 which is to form the right half of the picture image projected on the screen. As is previously explained, these half image portions are printed in the frame sections of the film in toe-to-toe arrangement, as is illustrated in Fig. 16. In Fig. 16A is shown a hypothetical figure 181, the image of which is to be projected by the present system to screen 102 of Figs. 15 and 16. The right half image portion R of this image 181 is arranged in the right side section 179 of the frame of film 101 and the left half image portion L of the image is arranged in the left side section 180 of the film, as the latter is viewed from behind the projector, or reversely as viewed from in front of the projector as in Fig. 15. It will be noted from Fig. 16 that the toe portions T of the right half image portion R and T' of the left half image portion L of the composite image 181 are arranged in an opposed relation on opposite sides of the film center line N". The left partial image 182 encompasses all of left exactly half image portion L and a vertical strip of the right exactly half image portion R with this strip constituting one half of a zone indicated between the leading end marginal lateral line c' and the dotted line i'. Likewise, the right partial image 183 encompasses all of the right exactly half image portion R and a vertical strip of the left exactly half image portion L with this strip constituting one half of a zone defined between the leading end marginal lateral line c and the dotted line i. These zones of the pair of image portions with each including the strip of the other image portion constitute the overlap zones which are to be lapped in register in the central or medial vertical zone of the screen in projection of the picture image.

Let it be assumed that one stands behind the projector through which film 101 is to be translated into projecting images thereon to the screen and that the section of film shown at the bottom of Fig. 16 represents the vertical position of the projector while the screen depicted in dash lines at 102 at the top of Fig. 16 represents a like vertical position of the latter with horizontal projection thereinto, i.e., there is no pitch in this particular theater construction. One may then view the partial images step-by-step at the various sub-assemblies and elements of the system indicated at I, II, III, IV, VL, VR, VIL, VIR, VIIL, VIIR, and VIII. The partial images 182 and 183 as they exit from the real image relay lens means 104 at II and impinge upon the reflecting face of oblique reflector 105 at III will, in 180° rotation of an image of the film frame in the common beam while being transferred toward remote real image plane IP2 at IV, have been transposed or crossed over to have the general inverted appearances illustrated at 184 in Fig. 16. These partial images 182 and 183 will then be turned down by the reflector 105 at III through 90° to the separating reflecting wedge 106 at IV having its longitudinal edge 164 located substantially in the real image plane IP2, which here will be a focal plane of relay lens means 104, so that the partial images will there be separated to appear on opposite oblique reflecting faces 185 and 186 of this wedge in the relative orientations indicated at 187 in Fig. 16 when one looks down from behind into these reflecting faces. The reflector 105 effects flip over or reversal of the partial images R and L so that their aligned overlap zones are now on the opposite side of the field of illumination as will be understood from a comparison of the images at 184 and 187 in Fig. 16. It will be noted, as is indicated at IV in Fig. 16, that now the overlap zones have become darkened as is indicated respectively at 188 and 189 by virtue of the operation of the rotary mask 177 which is located substantially at or as near as is practically possible to the image or focal plane in which the top edge 164 of reflecting wedge 106 is disposed, i.e., in the very near vicinity thereof. The turned, reversed and separated left partial image 282 is then turned through 90° and reflected laterally to the right by reflecting oblique face 185 of separating prism 106 to the oblique side reflecting prism 107 at VL, and in doing so it is rotated through 90° as is indicated by its orientation depicted in dotted lines at 190; this rotated partial image cannot actually be seen from behind since it appears on the face of the reflective back of reflecting prism 107 which explains the dotted lines showing at 190. Simultaneously, the turned, reversed and separated right partial image 283 is turned through 90° and reflected laterally to the left from the face 186 of reflecting separating prism 106 laterally to the other side reflecting prism 108 and is similarly rotated through 90° to appear on the reflective face of the latter in the orientation depicted in dotted lines at 191 of Fig. 16. Rotated left partial image 282 is then turned through 90° and passed forward by the reflecting prism 107 through the erecting objective lens sub-assembly 109 at VIL and criss-crossing refracting wedge prism III at VIIL for erection through 180°, as is indicated at 192 in Fig. 16, and then to be projected across over by the latter to the left section of screen 102 to have the appearance indicated at 382. Simultaneously, the rotated right partial image 283 is turned through 90° and reflected forward by the reflecting prism 108 successively through the erecting objective lens sub-assembly 110 at VIR and criss-crossing refracting prismatic achromat 112 at VIIR to be erected also through 180°, as is indicated at 193 in Fig. 16, and to be projected across over to the right section of the screen 102 there to appear as indicated at 383.

It will be noted from the top portion of Fig. 16 that now in the composite picture image projected upon the screen 102 the left half image portion L appears in the left section of the screen and the right half image portion R appears in the right half section of the screen with the juxtaposed portions of the half images constituting properly matched side-joining margins. Thus the complementary and separated image parts are projected on the screen 102 there to form the composite picture image in the nature of a mosaic assembly of the image parts beside each other. Darkened zone 188 of the left partial image or half image part 282 and darkened zone 189 of the right partial image or half image part 283 are overlapped in the central or medial vertical zone of the screen 102 so that the density of the total light therein will be substantially equal to the light density in the portions of the left and right half images 382 and 383 there adjacent, in order to avoid ready observance of such overlapped zones due to contrasts in light densities. Further avoidance of observance of the overlapped zones in the central vertical zone of the screen is assured by very rapidly fluctuating and shadowing the masked areas of the overlapped zones by means of the rotary mask 177, which will be explained in connection with Fig. 28.

As is indicated in Fig. 28 when the rotary mask 177 is rotated to have each of its blades 178 successively cut into and out of a marginal zone of the projected image beam 194 or field of illumination thereof, it will darken a minimum strip indicated at 195, increasingly darken a wider strip to a maximum indicated at 196 and then regressively darken the strip decreasing from the maximum indicated at 196 to the minimum indicated at 195, so that the image in a plane of composite picture image at the screen indicated at 197 will have its lapping zone provided with a darkened area which successively fluctuates. Each successive blade 178 performs a similar function and this is done simultaneously in each of the two transversely aligned overlap zones 188 and 189 of the partial left and right images 282 and 283 of Fig. 16. It will also be noted from Fig. 28 that each blade 178 in developing a complete fluctuation cycle of shading of an area of the overlapped zone also travels a distance axially of the beam, such as in traveling from the position indicated at 178–1 forward to the position indicated at 178–2. Since the rotary mask 177 is to be located on the approach side as near as possible to the real image plane IP2, i.e., with the path of the tips of the blades 178—178 thereof passing over the meeting edge 164 of the image-separating wedge 106 quite closely thereto without contact, as will be understood from the relative positions of this rotary mask and the real image plane IP2 indicated in Fig. 28, it will be seen that each blade is farthest out of focus in its approach position at 178–1 and nearest in focus at its position 178–2 and the focus condition thereof in the intermediate position 178–3 where the blade cuts into the projected image beam or field of illumination thereof the farthest is intermediate the focus conditions of these other two positions. Thus, each blade 178 first gradually cuts into a marginal zone of the projected image beam or field of illumination thereof at 178–1 to produce a minimum width darkened zone 195 while it is farthest out of focus and then in rotating up to the intermediate position 178–3 to widen the darkened zone to the width of 196 it gradually approaches toward in-focus condition, and thereafter in receding from the intermediate position to the final withdrawal position 178–2 so as gradually to reduce the width of the darkened zone again to that indicated at 195 it is progressively approaching in-focus condition. This gradually changes the shadow effect first from a fuzzy appearance while the darkened zone is of minimum width progressively to increased sharpness as the darkened zone is widened to its maximum and then again decreased to its minimum finally to provide a rather sharp marginal edge of darkened area in minimum width, and each blade successively performs this operation to give a pulsating effect from fuzzy appearance to substantially sharp in-focus condition as the blade produces a cycle of masking from minimum through maximum and then back to minimum width, thereby effecting a gradual blending of the margin of the darkened areas with the adjacent brighter areas of the overlapped zones in very rapid flickering sequence with simultaneous fluctuation of the sizes of the darkened areas. Quite sharp definition is attained when an object such as a rotating blade of this type is located in the very near vicinity of but out of a real image or focal plane, such as at a distance therefrom of the order of about twenty to twenty-five thousandths of an inch (0.020″–0.025″) and rotary mask 177 may be of an overall diameter (from blade tip diametrically across to blade tip) of the order of about three hundred and fifty thousandths of an inch (0.350″). As each blade of the rotary mask is gradually cut out of the edge of the field of illumination of the common beam from the maximum position 178–3 toward the cut-out position near 178–2 in Fig. 28, it is succeeded by the next following blade so that as it is approaching nearer to a more in-focus condition while rotating from the position at 178–1 to the position of 178–2, the next following blade begins to cut into the edge of the field of illumination in a completely out-of-focus condition so as to prevent the leading blade as it is cutting out of the edge of the field of illumination from permitting increased illumination to pass to the overlapping zones of the image portions on the screen. Thus while the shadowing by each blade progresses gradually from a narrow strip of the overlap zone of each partial image to one of maximum width and then back again to a narrow strip the sharpness of the shadowing progresses gradually from a completely out-of-focus condition, which gives a very fuzzy appearance, nearer and nearer to in-focus condition, without ever attaining the latter by being cut off in the narrow strip by the farthest out-of-focus fuzzy appearance caused by the next following blade. Thus the cyclic wave of width of shadowing will be of half-sine wave form with each successive pulsation beginning at the termination of the next preceding one. The change from farthest out-of-focus at the beginning of a cycle wave of shadowing width to a condition of nearest in-focus at the termination of this width wave pulse will be of sawtooth form with each focus pulse starting at a minimum value of farthest out-of-focus, gradually climbing obliquely to a value approaching but never reaching exact in-focus condition and then dropping off sharply substantially vertically back down to farthest out-of-focus condition. Each saw-tooth pulse of focus condition coincides in abscissa time interval with that of each half-sine pulse of shadowing width. Since the common beam is made up of a plurality of angularly related rays some of the oblique rays will have a tendency to pass over the edge of the blade into the shadowed zone therebeyond and increase its brightness to a limited degree, and this is true of each blade as it cuts into the edge of the field of illumination of the common beam from the position of 178–1 to the maximum position of 178–3 and then recedes to the position of 178–2 so that there is not a sharp light intensity definition at the edges of the shadowed zone which cyclically increases and decreases in width. It will thus be understood that when the rotary mask is provided with an appreciable number of blades, such as four or more, there is produced as a shadowing effect the cooperative results of the successive blades. The speed of this rotary radial blade mask or paddle shutter 177 is approximately four and one-half revolutions per frame (4½ rev./f.) of the translated film, but may be varied to improve the observed results of the operation of a particular installation. However, the speed of the rotary mask is independent of the light density of the images registered on the projection film. For example, assume a projector speed of twenty-four frames per second (24 f./sec.) or one thousand four hundred and forty frames per minute (1,440 f./min.) which multiplied by four and five tenths (4.5) gives a rotary speed of six thousand four hundred and eighty revolutions per minute (6,480 r.p.m.) for the rotary mask 177. As a result, when the rotary mask 177 has four blades which successively cut in and out of the overlapped zones of the two partial images there are twenty-five thousand nine hundred and twenty (25,920) blade flickers or fluctuations per minute or four hundred and thirty-two (432) flickers per second which provides eighteen (18) flickers or fluctuations per frame. The speed of the rotary mask may be varied up to about eighteen thousand revolutions per minute (18,000 r.p.m.), if desired, and, of course, variation in the speed thereof is accomplished by speed control of the driving motor 166 in conventional manner. The frequency of the flickers which cannot be consciously detected visually are those above six (6) flickers per frame, but a minimum number of twelve (12) flickers per frame of such masking device is required provided the flickers produced thereby are synchronized with the projector shutter which normally has three (3) blades producing six (6) flickers per frame. In order to avoid necessity of such synchronization, the number of masking blade flickers per frame should be greater than twelve (12), such as ideally eighteen (18) or more.

The reflecting side prisms 107 and 108 are pivotally mounted on horizontal axes, as previously explained, so that they may be adjusted by lateral rocking properly to bring to lateral alignment all transverse or horizontal line elements of the picture image parts on the screen, but instead of separately tilting these side reflectors to tilt in opposite directions the picture image sections on the screen for alignment of the horizontal line elements thereof the same effect may be obtained by rocking the image-separating reflecting wedge 106 on a transverse axis. Thus this reflecting wedge 106 and collectively the side reflectors 107 and 108 constitute a pair of orienting means for the horizontal line elements of the separated image portions to be selectively pivoted to bring to alignment on the screen the horizontal line elements of the separated image portions. Theoretically, the criss-crossing refracting prismatic achromats 111 and 112 are carefully constructed to eliminate color aberration but as a practical matter this theoretical ideal is frequently not attainable. Such a minor problem may be eliminated by criss-crossing the partial left and right images as they are projected to the screen without the use of such refracting prismatic achromats and this can be accomplished by pivotally mounting the lateral reflectors 107 and 108 on vertical axes with movable mountation of the erecting objective lens sub-assemblies 109 and 110 so that they will be swung with these side reflectors from relative parallel disposition to converging relation for directly criss-crossing the partial images projected thereby; and such converging relation may be built into the projecting optical unit in a predetermined fixed manner, if desired. The pair of laterally-spaced side reflectors 107 and 108 and the pair of laterally-spaced optical means each of which includes one of the objective lens means 109 and 110 which are located in the separate and laterally-spaced projecting paths to magnify and erect the separated and inverted images of the split image portions collectively constitute a pair of separated image portions-projecting means of such structure and relative orientation as to project the separated image portions properly on to the screen in side-by-side relation there to form a composite image. Also it may be desired to mount the motor 167 for driving the rotary radial blade mask or paddle shutter 177 universally so that it may be moved up and down as well as forward and back for complete adjustment of the position of the rotary mask to as near the focal plane as is possible and to attain the desired degree of masking or size of darkened areas of the overlap zones as may be desired.

It will be seen from Fig. 16 that the overlap zones of the partial images in which the rotary mask 177 is to have effect are located in the leading portion of each of the film frames. This assures that shading by the rotary mask is accomplished at the end of the image of each frame where the color chlor predominates when the light source is of the carbon arc type, blue predominating in the other end of the frame image. Consequently, the overlapped zones in the medial vertical zone of the screen will have the color chlor predominating with a carbon arc light source to give a brownish tint which is less perceptible than the color blue.

The diagrammatic arrangements illustrated in Figs. 15 and 16 represent the operation of a system installation wherein the projector is mounted at the same elevation as the center of the screen, i.e., where there is no theater pitch (vertical distance between screen and projector). In installations where the projector is elevated appreciably above the screen at a certain pitch distance, the pitch may be taken care of by pivoting the reflector 105 on a longitudinal axis so that it may be tilted laterally. This lateral tilting distorts the split image portions as they are reflected therefrom in directions opposite to the directions of distortion of these projected portions due to pitch. Such a feature is illustrated in Fig. 24 wherein oblique mirror 1050, similar to reflector 105, is shown pivotally mounted on a longitudinal axis by pivot pins 165, 165 journaled in brackets 1650, 1650 which, of course, would be supported by suitable frame structure, such as upright arm 129 of the Figs. 17 to 23 incl. structure and attaching means, thereby permitting lateral swing as indicated by the double-ended arrow. In either case, the oblique top reflector 105 or 1050 has its center substantially aligned with the axis of the relay lens means 104 or the axis of the common image-bearing beam projected therefrom and with its reflective face arranged at an oblique angle to a transverse plane normal to such axis. The central lateral line element of the partial images is substantially in focus across this oblique reflector 105 where such axis intersects its reflective face while other parts of these images are out of focus at the reflective face.

Fig. 29 diagrammatically illustrates structure of a conventional projector in which special film employed in the present system is translated down and past the gate aperture, the projector being equipped with conventional film-translating or pull-down mechanism, and, in accordance with the present invention, with the unit assembly of Figs. 17 to 23 incl. The lamp house is diagrammatically indicated at 198 and the projecting lamp or light source is indicated at 199 with the gate aperture 100 being located immediately behind the strip of special film 101, which is translated by conventional pull-down means, a portion of which is diagrammatically indicated at 200, down thereacross step-by-step in conventional manner with the bottom portions of the frames constituting the leading portions thereof and the top portions of the frames constituting the trailing portions thereof. Projection of the partial images in the film side sections 179 (L) and 180 (R) in the manner indicated in Fig. 16 is effected by the elements of the optical unit assembly 103, indicated in Fig. 15.

Since the relay lens sub-assembly 104 is axially adjustable, although the ratio of the size of the image on the film to the image being projected therefrom is 1:1, this can be varied by focusing this lens sub-assembly up to a ratio of about 1:1.2. Also, since the objective lens sub-assemblies 109 and 110 can also be moved axially for separate focusing, the size of the projected image is variable permitting the picture image projected on the screen to be varied and thus this lens system may be termed a variable focus lens assembly. The size of the picture image on the screen (p size) may be expressed in the terms of the following formula:

$$p \text{ size} = \frac{\text{distance from screen to projector}}{\text{focal length of the lens}}$$
$$\times \text{size of the projected image}$$

Thus, within limits it is possible to change the size of the picture image on the screen without changing the focal lengths of lens units, merely by changing the size of the projected image which is equivalent to the picture image size; and thus one may obtain thereby the same effect attainable by maintaining the projected image size constant and varying the focal length of the lens units.

In practicing the present invention with standard thirty-five millimeter (35 mm.), four-perforations, pull-down film, the composite image consisting of the matched partial images when joined together as in Fig. 16A is of a size of about forty-nine hundredths of an inch (0.490") high by one and forty-four hundredths of an inch (1.440") wide. It will thus be seen that the ratio of these dimensions is about 1:3. The amount of effective light is about 1.7 times as much as it is in a system using a normal image size ratio of 1:1.66 and much greater than that in a system using an image size ratio of 1:1.85. The width of the image is about twice that of images of conventional practice, being one and forty-four hundredths of an inch (1.440") wide compared to eight hundred and twenty-five thousandths of an inch (0.825") in width. Thus there is a gain in the amount of light usefully employed and in definition of about two times that attainable with the smaller aperture opening employed in conventional practice without requiring additional film cost or increase of light density from the projector light house. Since both portions of the composite picture image projected on the screen are simultaneously projected from partial images at the projector aperture having uniform light densities in their parts in the same transverse areas of the frame, light densities in both sections of the screen picture image will be desirably the same. Light density is normally the greatest in the center of the projector gate aperture and diminishes equally toward the top and bottom of the aperture which thus gives an ideal distribution of the light density in the center equal to the light density at the edges of the composite picture image projected on the screen, with maximum light emanating from the projector lamp house. The embodiments of the invention illustrated in the drawings have among many advantages the following important features: (a) the partial images separating means, i.e., the image portions-separating and rotating, reflecting prism, at the remote real image plane, which may be a front focal plane at the second focal point of the relay lens, is far removed from direct heat of the light source in the lamp house; (b) separating the partial images remote from the projector apparatus at a remote real image or focal plane assures effective separation without loss of light and definition while avoiding difficulties which may be attendant upon such separation in the vicinity of the aperture where there is elevated temperature and structural problems due to the presence of the aperture front gate; (c) in separating the partial images remote from the aperture it is no problem there to employ the desired masking means while the use of masking means in the vicinity of the aperture may involve problems of interference with aperture structure and possible scratching of the film; (d) embodiment of the system in a unit which may be substituted for the usual projector lens simplifies conversion without further revision of projector structure; (e) permitted use of standard back focal length lenses since no intervening prisms are required which necessitate use of lenses of unusual focal back lengths; (f) projecting partial images into curved sections of a curved screen substantially perpendicular to central tangents of those sections avoids undue distortion and attains effects similar to the use of two separate projectors without involving a problem of relative displacement of picture image parts; (g) perfect joining of the picture image portions without halo effect which involves discernible primary colors at the joining edges.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a wide screen projection system for a split image projection film having a succession of frames constituting a pair of parallel longitudinally-extending rows of frame sections with one section of each frame carrying one half part of a composite image having a marginal overlap zone including a side joining strip of this half image and the adjacent side joining strip of the other half part of the composite image and with the other section of each frame carrying the other half part of the composite image having a marginal overlap zone including duplications of the joining strips of the image parts, the marginal overlap zones of the image parts in the pair of sections of each film frame being aligned transversely of the film in a marginal zone of the frame with the image half parts therein being quarter rotated from normal upright disposition to one of the relations toe-to-toe and head-to-head, the combination with gate means defining a gate aperture, a projecting light source behind the gate means to emit a common projecting beam through the gate aperture with the common beam having a transverse marginal strip portion bearing the transversely-aligned marginal overlap zones of the image parts, film translating means to move such film along a path extending transversely through the common beam adjacent the gate aperture, image transfer positive lens means in front of said gate means having its back conjugate point located substantially at the film path with its forward conjugate point located remotely forward of the film path there to define a real image plane, optical beam-dividing means substantially at the remote image plane there to subdivide laterally along a longitudinal line the beam and simultaneously sharply separate the image parts to provide a pair of laterally-separated beam subdivisions each carrying only a different one of the pair of image parts with the separated beam subdivisions being projectable forward toward a wide screen along a pair of separate projecting paths, and a pair of optical means each mounted separately in one of the projecting paths of the beam subdivisions and with each including objective and image erecting means to magnify the separated image parts, rotate them to normal erect positions and project them to the screen with registration of their side-joining margins and aligned overlap of their duplicate overlap zones in the medial vertical zone of the screen to form on the latter a wide composite picture image; of rotary masking means having a plurality of axially-extending radial blades with said masking means being mounted between said image transfer positive lens means and said optical beam-dividing means for relatively rapid rotation about an axis in the near vicinity of and parallel to the remote image plane, means rotatably supporting said rotary masking means with its axis located substantially transversely of said beam-dividing means on the approach side of the latter and substantially normal to the longitudinal line of lateral subdivision of the common beam by said beam-dividing means, said rotary masking means extending substantially parallel to the area to be occupied by the transverse marginal strip portion of the common beam which carries the transversely-aligned marginal overlap zones of the image parts as the common beam approaches the remote image plane, and means rapidly to rotate said rotary masking means with successive rotation of each blade into the mentioned area of the transverse marginal strip portion of the common beam and at least partially thereout of to produce repetitively fluctuations in the width of the masked areas of the aligned marginal overlap zones with the masking effect changing progressively from a greatest degree of out-of-focus condition in the narrower masked areas toward an in-focus condition as the masked areas are increased to their widest and then gradually decreased to their narrowest in width.

2. In a wide screen projection system for a split image projection film having a succession of frames constituting a pair of parallel longitudinally-extending rows of frame sections with one section of each frame carrying one half part of a composite image having a marginal overlap zone including a side joining strip of this half image and the adjacent side joining strip of the other half part of the composite image and with the other section of each frame carrying the other half part of the composite image having a marginal overlap zone including duplications of the joining strips of the image parts, the marginal overlap zones of the image parts in the pair of sections of each film frame being aligned transversely of the film in a marginal zone of the frame with the image half parts therein being quarter rotated from normal upright disposition to one of the relations toe-to-toe and head-to-head, the combination with gate means defining a gate aperture, a projecting light source behind the gate means to emit a common projecting beam through the gate aperture with the common beam having a transverse marginal strip portion bearing the transversely-aligned marginal overlap zones of the image parts, film translating means to move such film along a path extending transversely through the common beam adjacent the gate aperture, image transfer positive lens means in front of said gate means having its back conjugate point located substantially at the film path with its forward conjugate point located remotely forward of the film path there to define a real image plane, optical beam-dividing means substantially at the remote image plane there to subdivide laterally along a longitudinal line the beam and simultaneously sharply separate the image parts to provide a pair of laterally-separated beam subdivisions each carrying only a different one of the pair of image parts with the separated beam subdivisions being projectable forward toward a wide screen along a pair of separate projecting paths, and a pair of optical means each mounted separately in one of the projecting paths of the beam subdivisions and with each including objective and image erecting means to magnify the separated image parts, rotate them to normal erect positions and project them to the screen with registration of their side-joining margins and aligned overlap of their duplicate overlap zones in the medial vertical zone of the screen to form on the latter a wide composite picture image; of an elongated rotary mask having a transversely-extending axial core carrying a plurality of axially-extending, circumferentially-spaced, radial blades each having an axially-extending tip edge and located between said image transfer positive lens means and said optical beam-dividing means in the near vicinity of and parallel to the remote image plane, means rotatably supporting said rotary mask with its axial core located substantially transversely of said beam-dividing means on the approach side of the latter and substantially normal to the longitudinal line of lateral subdivision of the common beam by said beam-dividing means, said rotary mask core extending substantially parallel to and outside of the area to be occupied by the transverse marginal strip portion of the common beam which carries the transversely-aligned marginal overlap zones of the image parts as the common beam approaches the remote image plane, and means rapidly to rotate said rotary mask with successive rotation of the tip edge of each blade into the mentioned area of the transverse marginal strip portion of the common beam and at least partially thereout of to produce repetitively fluctuations in the width of the masked areas of the aligned marginal overlap zones with the masking effect changing progressively from a greatest degree of out-of-focus condition in the narrower masked areas toward an in-focus condition as the masked areas are increased to their widest and then gradually decreased to their narrowest in width.

3. In a wide screen projection system for a split image projection film having a succession of frames constituting a pair of parallel longitudinally-extending rows of frame sections with one section of each frame carrying one half part of a composite image having a marginal overlap zone including a side joining strip of this half image and the adjacent side joining strip of the other half part of the composite image and with the other section of each frame carrying the other half part of the composite image having a marginal overlap zone including duplications of the joining strips of the image parts, the marginal overlap zones of the image parts in the pair of sections of each film frame being aligned transversely of the film in a marginal zone of the frame with the image half parts therein being quarter rotated from normal upright disposition to one of the relations toe-to-toe and head-to-head, the combination with gate means defining a gate aperture, a projecting light source behind the gate means to emit a common projecting beam through the gate aperture with the common beam having a transverse marginal strip portion bearing the transversely-aligned marginal overlap zones of the image parts, film translating means to move such film along a path extending transversely through the common beam adjacent the gate aperture, image transfer positive lens means in front of said gate means having its back conjugate point located substantially at the film path with its forward conjugate point located remotely forward of the film path there to define a real image plane, optical beam-dividing means substantially at the remote image plane there to subdivide laterally along a longitudinal line the beam and simultaneously sharply separate the image parts to provide a pair of laterally-separated beam subdivisions each carrying only a different one of the pair of image parts with the separated beam subdivisions being projectable forward toward a wide screen along a pair of separate projecting paths, and a pair of optical means each mounted separately in one of the projecting paths of the beam subdivisions and with each including objective and image erecting means to magnify the separated image parts, rotate them to normal erect positions and project them to the screen with registration of their side-joining margins and aligned overlap of their duplicate overlap zones in the medial vertical zone of the screen to form on the latter a wide composite picture image; of an elongated rotary mask having a transversely-extending axial core carrying a plurality of axially-extending, circumferentially-spaced, radial blades each having an axially-extending tip edge and located between said image transfer positive lens means and said optical beam-dividing means in the near vicinity of and parallel to the remote image plane with the tip edge of each blade being of a length at least equal to the transverse length of the elongated area to be occupied by the transverse marginal strip portion of the common beam which carries the transversely-aligned marginal overlap zones of the image parts as the common beam approaches the remote image plane, means rotatably supporting said mask axial core substantially transversely of said beam-dividing means on the approach side of the latter and substantially normal to the longitudinal line of lateral subdivision of the common beam by said beam-dividing means, said rotary mask core extending substantially parallel to and outside of this area of transversely-aligned overlap zones with the tip edges of said mask blades being successively rotatable thereby into and at least partially back out of this area, and driving means rapidly to rotate said rotary mask with successive rotation of the tip edge of each blade into the mentioned area of the transversely-aligned overlap zones and at least partially thereout of with the rotated blades producing repetitively fluctuations in the width of the masked areas of the aligned marginal overlap zones and progressive change of the masking effect from a greatest degree of out-of-focus condition in the narrower masked areas toward an in-focus condition as the masked areas are gradually increased to their widest and then gradually decreased to their narrowest in width.

4. In a wide screen projection system for a split image projection film having a succession of frames constituting a pair of parallel longitudinally-extending rows of frame sections with one section of each frame carrying one half part of a composite image having a marginal overlap zone including a side joining strip of this half image and the adjacent side joining strip of the other half part of the composite image and with the other section of each frame carrying the other half part of the composite image having a marginal overlap zone including duplications of the joining strips of the image parts, the marginal overlap zones of the image parts in the pair of sections of each film frame being aligned transversely of the film in a marginal zone of the frame with the image half parts therein being quarter rotated from normal upright disposition to one of the relations toe-to-toe and head-to-head, the combination with gate means defining a gate aperture, a projecting light source behind the gate means to emit a common projecting beam through the gate aperture, film translating means to move such film along a path extending transversely through the common beam adjacent the gate aperture, a common image relay positive lens means having a magnification factor of approximately unity and a speed of approximately one located in front of said gate means having a first conjugate point thereof located substantially at the film path and a second conjugate point thereof located remotely forward of the film path there to define a real image plane, a common beam-splitting, reflecting wedge having oppositely sloped reflecting faces facing backward into a common oncoming beam transmitted through said relay lens means with the meeting edge of said wedge reflecting faces located substantially at the remote image plane to subdivide the beam and simultaneously sharply separate the image parts thereat to provide a pair of laterally-separated beam subdivisions each carrying only a different one of the pair of image parts with the separated beam subdivisions being projectable forward toward a wide screen along a pair of separate projecting paths, and a pair of optical means each mounted separately in one of the projecting paths of the beam subdivisions and with each including objective and image erecting means to magnify the separated image parts, rotate them to normal erect positions and project them to the screen with registration of their side-joining margins and aligned overlap of their duplicate overlap zones in the medial vertical zone of the screen to form on the latter a wide composite picture image; of an elongated rotary mask having a transversely-extending axial core carrying a plurality of axially-extending, circumferentially-spaced, radial blades each having an axially-extending tip edge and located between said image relay lens means and reflecting wedge in the near vicinity of and parallel to the remote image plane with the tip edge of each blade being of a length at least equal to the width of the field of illumination of the wedge reflecting faces by the common oncoming beam, means rotatably supporting the axial core of said rotary mask substantially parallel to and outside of the area to be occupied by the transverse marginal strip portion of the common oncoming beam which carries the transversely aligned marginal overlap zones of the image parts as the common beam approaches the remote image plane with said mask core extending transversely of the meeting edge of said wedge reflecting faces at one end thereof, and independent driving means rapidly to rotate said rotary mask with successive rotation of the tip edge of each blade into the mentioned area of the transverse marginal strip portion of the common beam and at least partially thereout of to produce repetitively fluctuations in the width of the masked areas of the aligned marginal overlap zones with the masking effect changing progressively from a greatest degree of out-of-focus condition in the narrower masked areas toward an in-focus condition as the masked areas are gradually increased to their widest and then gradually decreased to their narrowest in width.

5. A wide screen projection system for a split image projection film having a succession of frames constituting a pair of parallel longitudinally-extending rows of frame sections with one section of each frame carrying one half part of a composite image having a marginal overlap zone including a side joining strip of this half image and the adjacent side joining strip of the other half part of the composite image and with the other section of each frame carrying the other half part of the composite image having a marginal overlap zone including duplications of the joining strips of the image parts, the marginal overlap zones of the image parts in the pair of sections of each film frame being aligned transversely of the film in a marginal zone of the frame with the image half parts arranged therein at 90° rotation from normal upright disposition to one of the relations toe-to-toe and head-to-head, comprising, in combination with gate means defining a gate aperture, a projecting light source behind the gate means to emit a common projecting beam through the gate aperture, and film translating means to move such film along a path extending transversely through the common beam adjacent the gate aperture, of image relay positive lens means in front of the gate aperture and the film path thereat having a magnification factor of approximately unity and a speed of approximately one with its first principal focus located at the film path to transmit the common beam therethrough to a forward real image plane at its second principal focus remote from the film path with a real image of each successive film frame formed at this plane, optical beam-dividing means at the remote image plane to subdivide the beam and simultaneously sharply separate the image parts thereat to provide a pair of laterally-separated beam subdivisions with each of the latter carrying only a different one of the said pair of image parts and the other beam subdivision carrying only the other of said pair of image parts, optical beam redirecting means located to opposite sides of said beam-dividing means with one thereof being adatped to receive one of the beam subdivisions and turn it forward toward a wide screen and the other being adapted to receive the other beam subdivision and also turn it forward toward the screen for separate forward projection to the latter along a pair of separate projecting paths of said separated pair of image parts, the pair of beam subdivisions and the separated image parts respectively carried thereby being quarter rotated through 90° in opposite directions to inverted upside down positions in passage along their separate paths from said beam-dividing means at the remote image plane past the beam redirecting means, and a pair of optical means beyond the beam redirecting means each mounted separately in one of the projecting paths of the beam subdivisions which carry respectively the separated inverted image parts, and with each of the latter optical means including objective lens means and image erecting means to magnify the separated image parts, rotate them through 180° to normal erect positions and project them to the screen in side-by-side relation and in focus at the latter with registration of their side-joining margins and aligned overlap of their duplicate overlap zones in the medial vertical zone of the screen to form from the separated image parts on the latter a wide composite picture image in the nature of a mosaic assembly of the image parts beside each other.

6. A wide screen projection system for a split image projection film having a succession of frames constituting a pair of parallel longitudinally-extending rows of frame sections with one section of each frame carrying one half part of a composite image and the other section of each frame carrying the other half part of the composite image with each image part having a side-joining margin, the image parts in the pair of sections of each frame being arranged at 90° rotation from normal disposition in one of relations toe-to-toe and head-to-head, comprising, in combination with gate means defining a gate aperture, a projecting light source behind the gate means to emit a projecting beam through the gate aperture, and film translating means to move such film along a path extending transversely through the beam adjacent the gate aperture, of image relay positive lens means in front of the gate aperture and the film path thereat having a magnification factor of approximately unity and a speed of approximately one with its first princapal focus located at the film path to transmit the beam therethrough to a forward real image plane at its second principal focus remote from the film with a real image of each successive film frame formed at this plane, beam splitting optical means located at the forward real image plane there to subdivide the beam into a pair of laterally-extending beam subdivisions and to separate sharply thereat the pair of different image parts with each beam subdivision carrying solely one of the said pair of image parts and the other beam subdivision carrying solely the other of said pair of image parts, a pair of beam-turning reflecting means located on opposite sides of said beam splitting and image separating means to turn and redirect the beam subdivisions forward into separate paths extending toward a screen for separate projection to the screen of said separated pair of image parts, the pair of beam subdivisions and the separated image parts respectively being carried thereby being quarter rotated through 90° in opposite directions to inverted upside down positions in passage along their separate paths from said beam splitting means at the remote real image plane past the pair of beam-turning reflecting means, and a pair of optical means beyond said pair of beam-turning reflecting means in the separate paths of the beam subdivisions which carry respectively the separated inverted image parts, each of the latter optical means including objective and image erecting means to magnify the separated image parts, rotate them through 180° to normal erect positions and project them to the screen in side-by-side relation and in focus at the latter with registration of their side-joining margins on the screen there to form from the separated image parts a composite picture image in the nature of a mosaic assembly of the image parts beside each other.

7. The optical projecting unit assembly as defined in claim 6 characterized by an oblique reflector interposed between said relay lens means and said image-parts-separating and beam-splitting optical means having its reflecting face arranged at an oblique angle to a transverse plane normal to the axis of an image bearing beam projectable by said relay lens means whereby parts of images reflected thereby are out of precise focus.

8. The optical projecting unit assembly as defined in claim 7 characterized by means pivotally supporting said oblique reflector on its longitudinal axis for lateral tilt thereof.

9. A wide screen projection system for a split image projection film having a succession of frames constituting a pair of parallel longitudinally-extending rows of frame sections with one section of each frame carrying one half part of a composite image having a marginal overlap zone including a side joining strip of this half image and the adjacent side joining strip of the other half part of the composite image and with the other section of each frame carrying the other half part of the composite image having a marginal overlap zone including duplications of the joining strips of the image parts, the marginal overlap zones of the image parts in the pair of sections of each film frame being aligned transversely of the film with the image half parts therein being quarter rotated from normal upright disposition to one of the relations toe-to-toe and head-to-head, comprising, in combination with gate means defining a gate aperture, a projecting light source behind the gate means to emit a common projecting beam through the gate aperture with the common beam having a marginal lateral portion bearing the transversely aligned marginal overlap zones of the image parts, and film translating means to move such film along a path extending transversely through the common beam adjacent the gate aperture, of relay positive lens means in front of the gate aperture and the film path having its first principal focus located at the latter to transmit the common beam therethrough to a forward image plane at its second principal focus remote from the film with a real image of each successive film frame formed at this plane, beam splitting means located at the forward real image plane there to subdivide laterally along a longitudinal line of the common beam into a pair of laterally-extending beam subdivisions and to separate sharply thereat the pair of different image parts projected from each pair of frame sections with each beam subdivision carrying a different one of the pair of image parts, driven rotary masking means having a plurality of axially-extending radial blades, means rotatably mounting said masking means between said relay lens means and said beam splitting means for rotation about an axis in the near vicinity of and parallel to the forward real image plane with said rotary masking means positioned transversely of said beam splitting means on the approach side of the latter and substantially normal to the longitudinal line of lateral subdivision of the common beam by said beam splitting means, said radial blades extending axially the full width of that marginal lateral portion of the common beam which carries the transversely aligned marginal overlap zones of the image parts and positioned for successive rotation of each blade into and at least partially thereout of to produce repetitively fluctuations in the width of the masked areas of the aligned marginal overlap zones with the masking effect changing progressively from a greatest degree of out-of-focus condition in the narrower masked areas toward an in-focus condition as the masked areas are increased to their widest and then decreased to their narrowest in width, a pair of beam-turning optical means located on opposite sides of said beam-splitting and image-separating means to turn the beam subdivisions forward into separate paths extending toward a wide screen, and a pair of optical means in the paths of the beam subdivisions each including objective and image erecting means to magnify the separate image parts, rotate them to normal erect positions and project them to the screen with overlap of their masked marginal overlap zones on the screen there to form a wide composite picture image.

10. An optical projecting unit assembly for attachment to a single conventional motion picture projector in substitution for its lens to project from a split image projection film quarter-rotated split image portions of a composite image in relative orientations of one of the relations toe-to-toe and head-to-head with the film having a succession of frames constituting a pair of parallel longitudinally-extending rows of frame sections in each of which one section carries one of the pair of split image portions in the form of one half part of a composite image having a marginal overlap zone including a side joining strip of this half image and the adjacent side joining strip of the other half part of the composite image and the other section of each frame carries the other of the pair of split image portions in the form of the other half part of the composite image having a marginal overlap zone including duplications of the joining strips of the image parts, the marginal overlap zones of the pair of split image portions in the pair of sections of each film frame being aligned transversely of the film in a marginal zone of the frame comprising, in combination, a common relay positive lens means to project to a real image plane remote from the film a common projecting beam carrying side-by-side the real image portions with the marginal overlap zones thereof being transversely-aligned, beam splitting optical means at this real image plane there sharply to separate and reflect laterally to opposite sides projections of the quarter rotated split image portions with quarter rotations thereof to arrange them in inverted positions, a pair of laterally-separated reflecting means located to opposite sides of said image separating optical means separately to turn the inverted split image portions forward toward a screen, a pair of laterally-separated optical means comprising objective lens means to erect the inverted split image portions and project them to the screen in side-by-side relation, and driven high speed rotary masking means located on the approach side of and in the near vicinity of said real image plane and the beam splitting optical means thereat to decrease light density simultaneously in the aligned marginal overlap zones of the projections of the split image portions along the full extent thereof so that when they are lapped together in the central vertical zone of a screen the density of light in the latter will substantially equal that in adjacent picture image areas, said rotary masking means being in the form of an elongated rotatable structure having a plurality of axially-extending radial blades which are of axial lengths at least equal to the combined extent of the transversely aligned marginal overlap zones of the complementary image portions to be successively rotated simultaneously into and out of areas of these aligned zones to effect repeated rapid fluctuations in areas thereof shaded by masking with attendant repeated fluctuations in the focused clarity of the masking effects.

11. An optical projecting unit assembly for attachment to a single conventional motion picture projector in substitution for its lens to project from a split image projection film a pair of quarter-rotated split image half portions of a composite image which are laterally spaced from each other on the film and are in relative orientations of one of the relations toe-to-toe and head-to-head comprising, in combination, a common relay positive lens means to project the image portions simultaneously to a real image plane remote from the film, beam splitting optical means at this real image plane there sharply to separate and reflect laterally to opposite sides a pair of beam subdivisions with each beam subdivision carrying solely one of said image half portions and the other beam subdivision carrying solely the other of said image half portions, said beam splitting means being adapted in the lateral reflection to opposite sides thereof of the beam subdivisions to quarter rotate in opposite directions to inverted positions the separated quarter-rotated split image portions respectively and solely carried by the separated beam subdivisions, a pair of laterally-separated reflecting means located to opposite sides of said image separating and beam splitting optical means separately to redirect and turn the beam subdivisions and the inverted split image portions carried thereby forward toward a screen, a pair of laterally-separated optical means comprising objective lens means to erect the separated and inverted split image portions through 180° and project them separately to the screen in side-by-side relation and in focus at the latter with registration of their side-joining margins on the screen there to form from the separated image parts a composite picture image in the nature of a mosaic assembly of the image parts beside each other, and an oblique reflector interposed between said relay lens means and said image-portions-separating and beam-splitting optical means having its reflecting face arranged at an oblique angle to a transverse plane normal to the axis of an image bearing beam projectable by said relay lens means whereby parts of images reflected thereby are out of precise focus.

12. The optical projecting unit assembly as defined in claim 11 characterized by means pivotally supporting said oblique reflector on its longitudinal axis for lateral tilt thereof.

13. An optical projecting unit assembly for attachment to a single conventional motion picture projector in substitution for its lens to project from a split image projection film pairs of quarter-rotated split image portions of a composite image in relative orientations of one of the relations toe-to-toe and head-to-head with the film having a succession of frames constituting a pair of parallel longitudinally-extending rows of frame sections in each of which one section carries one of the pair of split image portions in the form of one half part of a composite image having a marginal overlap zone including a side joining strip of this half image and the adjacent side joining strip of the other half part of the composite image and the other section of each frame carries the other of the pair of split image portions in the form of the other half part of the composite image having a marginal overlap zone including duplications of the joining strips of the image parts, the marginal overlap zones of the pair of split image portions in the pair of sections of each film frame being aligned transversely of the film in a marginal zone of the frame, comprising, in combination; a common image relay positive lens means having a magnification factor of about unity and a speed of about one with its first principal focus locatable at the film to project a common beam carrying the split image portions simultaneously to a forward real image plane remote from the film at the second principal focus of said relay lens means; a common oblique reflector mounted in front of said relay lens means short of said remote image plane with its center substantially aligned with the axis of said relay lens means and its image-receptive surface facing back toward said relay lens means and arranged at an oblique angle to a transverse plane normal to said axis to receive from said relay lens means the common beam carrying the split image portions; a common image-portions-separating and beam-splitting reflecting wedge means mounted beyond and to one side of said oblique reflector having oppositely-sloped reflecting faces arranged separately to receive from said oblique reflector the common beam carrying the split image portions and with the meeting edge of said reflecting faces arranged substantially at the said remote image plane; a driven, high speed, rotary elongated mask positioned transversely of said meeting edge of said separating reflecting wedge means on the approach side thereof in the near vicinity of said remote image plane and having a plurality of longitudinally-extending radial blades extending axially the full width of and rotatable into and out of the area of the marginal zone of the field of illumination of the sloping reflecting faces of said wedge means in which appears an image of the marginal zone of each frame that includes the aligned marginal overlap zones of the split image portions; a pair of side reflectors mounted on opposite lateral sides of said separating reflecting wedge means with their reflecting faces extending upwardly in planes laterally oblique in opposite directions to the axis of said relay lens means and respectively opposed to the sloping reflecting faces of said wedge means for separately receiving therefrom the separated split image portions in reverse rotated and inverted orientation, said pair of side reflectors being adapted to turn the separated and rotated split image portions forward for projection to a wide screen; and a pair of laterally-separated optical means comprising objective lens means to erect the inverted split image portions and project them forward onto the screen in side-by-side relation with aligned overlap in a medial vertical portion of the screen of the marginal overlap zones of the split image portions.

14. The optical projecting unit assembly defined in claim 13 characterized by means pivotally supporting said common oblique reflector on its upwardly-extending longitudinal axis for lateral tilt of its reflective face.

15. The optical projecting unit assembly as defined in claim 13 characterized by said common reflecting wedge means and collectively said side reflectors constituting a pair of orienting means for the horizontal line elements of the separated image portions with one of said orienting means being pivotally supported by substantially horizontal pivot means for tilt to bring to alignment on the screen the horizontal line elements of the separated image portions.

16. The optical projecting unit assembly as defined in claim 15 characterized by said pivoted orienting means being said separating reflecting wedge means with its pivot means being arranged on a transverse axis substantially normal to the optical axis of said relay lens means for up and down tilt of the ends thereof.

17. The optical projecting unit assembly as defined in claim 15 characterized by said pivoted orienting means being said pair of side reflectors with the pivot means of each being arranged on separate forwardly-extending axes for lateral tilt.

18. An optical projecting unit assembly for attachment to a single conventional motion picture projector having a gate aperture and film path extending across the latter, in substitution for its conventional objective lens means, simultaneously to project from a split image projection film a pair of quarter-rotated split image portions of a composite image in relative orientations of one of the relations toe-to-toe and head-to-head with each image portion having a side-joining marginal overlap zone consisting of a vertical image strip of one half portion of a composite image adjacent the vertical centerline of the latter and the adjacent vertical image strip of the other half image portion and with these overlap zones aligned transversely of the film, comprising, in combination; a common image relay positive lens means having a magnification factor of about unity and a speed of about one with a first conjugate point thereof locatable at the film path across the gate aperture of the projector to project the image portions forward along the axis of said relay lens means simultaneously to a real image plane at the second conjugate point remote from the film; a common beam turning, oblique reflector mounted in front of and facing back toward said relay lens means short of said remote image plane and intercepting the optical axis of said relay lens means to have a certain angle of incidence; a common beam-splitting, reflecting wedge mounted beyond and to one side of said oblique reflector having oppositely sloped reflecting faces facing back toward said oblique reflector in the path of relay lens-transmitted rays reflected from said oblique reflector with the meeting edge of said wedge faces located at said remote image plane there sharply to separate images of the split image portions and reflect them laterally to opposite sides of said reflecting wedge; a driven, high speed, rotary, elongated mask located between said oblique reflector and said reflecting wedge and including an elongated axial core extending transversely of one end of said reflecting wedge meeting edge to one side and out of the field of illumination of said wedge reflecting faces with said core carrying a plurality of longitudinally-extending, circumferentially-spaced, radial blades each having an axially-extending tip edge of an axial length at least equal to the width of the field of illumination rotatable in a circular path which closely approaches said remote image plane at said reflecting wedge meeting edge and which will cut into and out of the aligned images of the marginal overlap zones of the split image portions before separation for fluctuatingly masking areas thereof repetitively with respect to both width of the masked areas and focus condition of the blade shadowing thereof; a pair of laterally-spaced side reflectors mounted on opposite lateral sides of said reflecting wedge facing in opposite directions obliquely toward said reflecting faces of the latter and extending upwardly in planes laterally oblique in opposite directions to the axis of said relay lens means respectively to receive the separated reflected images of the split image portions in reverse rotated and inverted orientation and reflect them forward toward a wide screen along separate paths; and a pair of laterally-spaced optical means each comprising an objective mounted in one of the latter separate paths to magnify and erect the separated inverted images of the split image portions; said laterally-spaced side reflectors and optical means constituting a pair of separated image portions-projecting means of such structure and relative orientation as to project the separated image portions in criss-cross manner onto the wide screen with central vertical overlap of the mask-affected marginal overlap zones thereof to form a composite image of substantially uniform light density in its central area.

References Cited in the file of this patent

UNITED STATES PATENTS

| | | |
|---|---|---|
| 1,843,439 | Bauersfeld et al. | Feb. 2, 1932 |
| 1,863,078 | Woodland | June 14, 1932 |
| 1,906,215 | Nicolson | Apr. 25, 1933 |
| 1,964,968 | Warmisham | July 3, 1934 |
| 2,313,561 | Mainardi et al. | Mar. 9, 1943 |
| 2,398,276 | Altman | Apr. 9, 1946 |
| 2,544,116 | Waller et al. | Mar. 6, 1951 |
| 2,627,201 | Baker | Feb. 3, 1953 |
| 2,693,128 | Dewhurst | Nov. 2, 1954 |

FOREIGN PATENTS

| | | |
|---|---|---|
| 23,396 | Great Britain | Oct. 23, 1907 |
| 186,993 | Great Britain | Oct. 9, 1922 |
| 670,111 | Great Britain | Apr. 16, 1952 |
| 756,475 | Great Britain | Sept. 5, 1956 |
| 768,243 | Great Britain | Feb. 13, 1957 |
| 1,090,497 | France | Oct. 20, 1954 |
| 1,136,355 | France | Dec. 29, 1956 |